(12) United States Patent
Hong et al.

(10) Patent No.: US 11,604,346 B2
(45) Date of Patent: Mar. 14, 2023

(54) STRUCTURED ILLUMINATION OF A SAMPLE

(71) Applicant: Illumina, Inc., San Diego, CA (US)

(72) Inventors: Stanley S. Hong, Palo Alto, CA (US); William McGuigan, San Diego, CA (US); Frank DeWitt, IV, Lima, NY (US)

(73) Assignee: Illumina, Inc., San Diego, CA (US)

( * ) Notice: Subject to any disclaimer, the term of this patent is extended or adjusted under 35 U.S.C. 154(b) by 251 days.

(21) Appl. No.: 17/248,190

(22) Filed: Jan. 13, 2021

(65) Prior Publication Data

US 2021/0132365 A1   May 6, 2021

Related U.S. Application Data

(63) Continuation of application No. 16/573,449, filed on Sep. 17, 2019, now Pat. No. 10,901,202.

(60) Provisional application No. 62/733,330, filed on Sep. 19, 2018.

(30) Foreign Application Priority Data

Dec. 21, 2018  (NL) ....................................... 2022286

(51) Int. Cl.
 *G02B 26/08* (2006.01)
 *G01N 1/06* (2006.01)
(52) U.S. Cl.
 CPC ........... *G02B 26/0833* (2013.01); *G01N 1/06* (2013.01); *G01N 2001/068* (2013.01)
(58) Field of Classification Search
 CPC . G02B 26/0833; G01N 1/06; G01N 2001/068
 USPC ............................ 356/610–626, 237.2–237.6
 See application file for complete search history.

(56) References Cited

U.S. PATENT DOCUMENTS

| | | | |
|---|---|---|---|
| 3,856,986 A | 12/1974 | Macovski | |
| 4,213,706 A | 7/1980 | Hill et al. | |
| 4,862,468 A | 8/1989 | Fink | |
| 5,621,561 A * | 4/1997 | Belfatto | ................ G02B 27/09 359/201.1 |
| 5,761,085 A | 6/1998 | Giorgio | |
| 6,188,478 B1 | 2/2001 | Fuchs et al. | |
| 6,583,873 B1 | 6/2003 | Goncharov et al. | |

(Continued)

FOREIGN PATENT DOCUMENTS

| | | |
|---|---|---|
| CA | 2524242 A1 | 4/2007 |
| CA | 2555477 A1 | 4/2007 |

(Continued)

OTHER PUBLICATIONS

APOTOME: Suddenly Everything Looks Different, Carl Zeiss, 2014.

(Continued)

*Primary Examiner* — Isiaka O Akanbi
(74) *Attorney, Agent, or Firm* — Brake Hughes Bellermann LLP

(57) ABSTRACT

A system includes: a light source; first and second gratings; and at least one reflective component that in a first position forms a first light path originating at the light source and extending to the first grating and thereafter to a subsequent component in the system, and that in a second position forms a second light path originating at the light source and extending to the second grating and thereafter to the subsequent component.

20 Claims, 10 Drawing Sheets

(56) References Cited

U.S. PATENT DOCUMENTS

| | | | |
|---|---|---|---|
| 6,898,004 B2 | 5/2005 | Shimizu et al. | |
| 7,274,446 B2 | 9/2007 | Wolleschensky et al. | |
| 7,532,323 B2 | 5/2009 | Tang et al. | |
| 8,222,040 B2 | 7/2012 | Hong et al. | |
| 8,502,867 B2 | 8/2013 | Park | |
| 8,509,879 B2 | 8/2013 | Durkin et al. | |
| 8,570,650 B2 | 10/2013 | Dougherty et al. | |
| 8,759,077 B2 | 6/2014 | Hong et al. | |
| 8,796,185 B2 | 8/2014 | Kim et al. | |
| 8,817,362 B2 | 8/2014 | Lee | |
| 8,848,199 B2 | 9/2014 | Choi et al. | |
| 9,458,501 B2 | 10/2016 | Hong et al. | |
| 9,465,228 B2 | 10/2016 | Lee et al. | |
| 9,772,505 B2 | 9/2017 | Lee et al. | |
| 9,897,790 B2 | 2/2018 | Nakayama et al. | |
| 9,989,746 B2 | 6/2018 | Bathe et al. | |
| 10,378,053 B2 | 8/2019 | Staker et al. | |
| 10,429,665 B2 | 10/2019 | Lee et al. | |
| 2001/0006421 A1* | 7/2001 | Parriaux | G01D 5/38 356/499 |
| 2004/0035529 A1 | 2/2004 | Grimbergen | |
| 2005/0239115 A1 | 10/2005 | Ryu et al. | |
| 2007/0046946 A1* | 3/2007 | Namiki | G01J 3/02 356/456 |
| 2007/0091401 A1 | 4/2007 | Dufour et al. | |
| 2007/0195334 A1* | 8/2007 | Tamiya | G01D 5/38 356/616 |
| 2009/0219607 A1 | 9/2009 | Saggau et al. | |
| 2009/0225407 A1 | 9/2009 | Nakayama et al. | |
| 2009/0238449 A1 | 9/2009 | Zhang et al. | |
| 2009/0250632 A1 | 10/2009 | Kempe et al. | |
| 2011/0036996 A1 | 2/2011 | Wolleschensky et al. | |
| 2012/0162646 A1* | 6/2012 | Holzapfel | G01D 5/38 356/369 |
| 2013/0068967 A1* | 3/2013 | Kleppe | G02B 27/56 250/459.1 |
| 2015/0253559 A1 | 9/2015 | Kalkbrenner et al. | |
| 2016/0116757 A1* | 4/2016 | Kimura | G02B 27/144 250/231.1 |
| 2018/0088454 A1 | 3/2018 | Li | |
| 2020/0004004 A1* | 1/2020 | Carney | G06T 7/11 |

FOREIGN PATENT DOCUMENTS

| | | | |
|---|---|---|---|
| CN | 1292227 C | | 12/2006 |
| CN | 103308004 A | | 9/2013 |
| CN | 104535019 A | * | 4/2015 |
| CN | 104535019 A | | 4/2015 |
| CN | 104749866 A | | 7/2015 |
| CN | 105549314 A | | 5/2016 |
| CN | 211426904 U | | 9/2020 |
| DE | 102012017917 A1 | | 3/2014 |
| JP | S6068314 A | | 4/1985 |
| JP | 2005080181 A | | 3/2005 |
| JP | 2016085055 A | | 5/2016 |
| KR | 20040001590 A | | 1/2004 |
| TW | 512459 B | | 12/2002 |
| TW | I223057 B | | 11/2004 |
| WO | 8808631 A1 | | 11/1988 |
| WO | 1988008631 | | 11/1988 |
| WO | 2004030166 A1 | | 4/2004 |
| WO | 2009100830 A1 | | 8/2009 |
| WO | 2010036909 A1 | | 4/2010 |
| WO | 2014040800 A1 | | 3/2014 |

OTHER PUBLICATIONS

Del Tavision™ OMX SR Super-Resolution Microscope, General Electric Co., 2015.

Frohn, et al., "Three-dimensional resolution enhancement in fluorescence microscopy by harmonic excitation" Optics Letters 26 (11), 828-830, 2001.

Frohn, et al., "True optical resolution beyond the Rayleigh limit achieved by standing wave illumination" PNAS 97 (13), 7232-7236, 2000.

Rishnamurthi, et al., "Image processing in 3D standing-wave fluorescence microscopy" Three-Dimensional Microscopy: Image Acquisition and Processing III vol. 2655, International Society for Optics and Photonics, 18-25, Apr. 10, 1996.

U.S. Appl. No. 16/573,449, filed Sep. 17, 2019, Patented.

Office Action for Chinese Application No. 201910882910.X, dated Apr. 21, 2021, 7 pages.

* cited by examiner

STRUCTURED ILLUMINATION OF A SAMPLE

CROSS-REFERENCE TO RELATED APPLICATIONS

This application is a continuation of, and claims priority to, U.S. application Ser. No. 16/573,449, filed Sep. 17, 2019, which is a non-provisional application of, and claims the benefit of the filing date of, U.S. provisional application 62/733,330, filed Sep. 19, 2018, the contents of both of which are incorporated herein by reference.

This application claims priority to Netherlands patent application N2022286, filed Dec. 21, 2018, the contents of which are incorporated herein by reference.

BACKGROUND

Structured illumination microscopy (SIM) has been used to increase the resolution of images obtained from a sample. SIM utilizes several images of a sample with differing fringe patterns so that different locations on the sample are exposed to a range of illumination intensities. In some instances, the procedure can be repeated by rotating the pattern orientation about the optical axis at separate angles. The captured images may be assembled into a single image having an extended spatial frequency bandwidth, which may be retransformed into real space to generate an image having a higher resolution than one captured by a conventional microscope. Existing approaches to SIM may have one or more characteristics that increase the complexity, size, manufacturing cost, and/or the cost of operation of the system.

SUMMARY

In a first aspect, a system includes: a light source; first and second gratings; and at least one reflective component that in a first position forms a first light path originating at the light source and extending to the first grating and thereafter to a subsequent component in the system, and that in a second position forms a second light path originating at the light source and extending to the second grating and thereafter to the subsequent component.

Implementations can include any or all of the following features. The reflective component includes a rotatable mirror that assumes the first or second positions. The rotatable mirror is double-sided and comprises an elongate member, and wherein an axle is coupled to the elongate member substantially at a center of the elongate member. The axle is offset from and substantially parallel to a plane defined by the first and second light paths. When the rotatable mirror assumes the first position, a first end of the elongate member interrupts a first path originating at the light source and extending to the second grating, and reflects first light originating at the light source toward the first grating. When the rotatable mirror assumes the first position, a second end of the elongate member does not interrupt a second path from the first grating to the subsequent component. When the rotatable mirror assumes the second position, a second end of the elongate member interrupts a second path from the second grating, and reflects second light from the second grating toward the subsequent component. When the rotatable mirror assumes the second position, the first end of the elongate member does not interrupt the first path originating at the light source and extending to the second grating. The first and second gratings are oriented so that respective normals thereof are substantially antiparallel to each other, and wherein the axle is substantially aligned with the normals. The rotatable mirror reciprocates between the first and second positions. The reflective component includes a first translatable mirror that undergoes first translation into the first position. The reflective component further includes a second translatable mirror that undergoes second translation into the second position. The first and second translations are substantially perpendicular to a plane defined by the first and second light paths. The first translation is substantially parallel to a plane defined by the first and second light paths. The first translatable mirror undergoes a second translation into the second position, and wherein the second translation is substantially parallel to the plane defined by the first and second light paths. The reflective component includes a rotatable prism that assumes the first or second positions. The first and second gratings are positioned adjacent each other, wherein the rotatable prism in the first position reflects first light along the first light path toward the first grating, and wherein the rotatable prism in the second position reflects second light along the second light path toward the second grating. The first and second gratings face toward the subsequent component. The first and second gratings are in a fixed position relative to the light source. The subsequent component is a phase selector. The system further comprises a phase selector positioned between the light source and the reflective component. The phase selector is in a fixed position relative to the light source.

In a second aspect, a system includes: a light source; first and second gratings; and at least one mirror having a first position that interrupts a first path originating at the light source and extending to the second grating, and directs first light toward the first grating, while not interrupting a second path from the first grating to a subsequent component in the system, and having a second position that interrupts a third path from the second grating and directs second light from the second grating toward the subsequent component, while not interrupting the first path.

Implementations can include any or all of the following features. Respective grating orientations of the first and second gratings are substantially perpendicular to each other. The first and second gratings face toward each other. The subsequent component is a phase selector. The system further comprises a phase selector positioned between the light source and the at least one mirror.

In a third aspect, a method includes: positioning at least one reflective component to define a first light path originating at a light source and extending to a first grating and thereafter to a subsequent component; directing first phase-selected light from the first light path onto a sample; positioning the at least one reflective component to define a second light path originating at the light source and extending to a second grating and thereafter to the subsequent component; and directing second phase-selected light from the second light path onto the sample.

Implementations can include any or all of the following features. Positioning the at least one reflective component to define the first light path comprises interrupting a first path originating at the light source and extending to the second grating and directing first light toward the first grating, while not interrupting a second path from the first grating to the subsequent component. Positioning the at least one reflective component to define the second light path comprises interrupting a third path from the second grating and directing second light from the second grating toward the subsequent component, while not interrupting the first path.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

DETAILED DESCRIPTION

Figure 1:
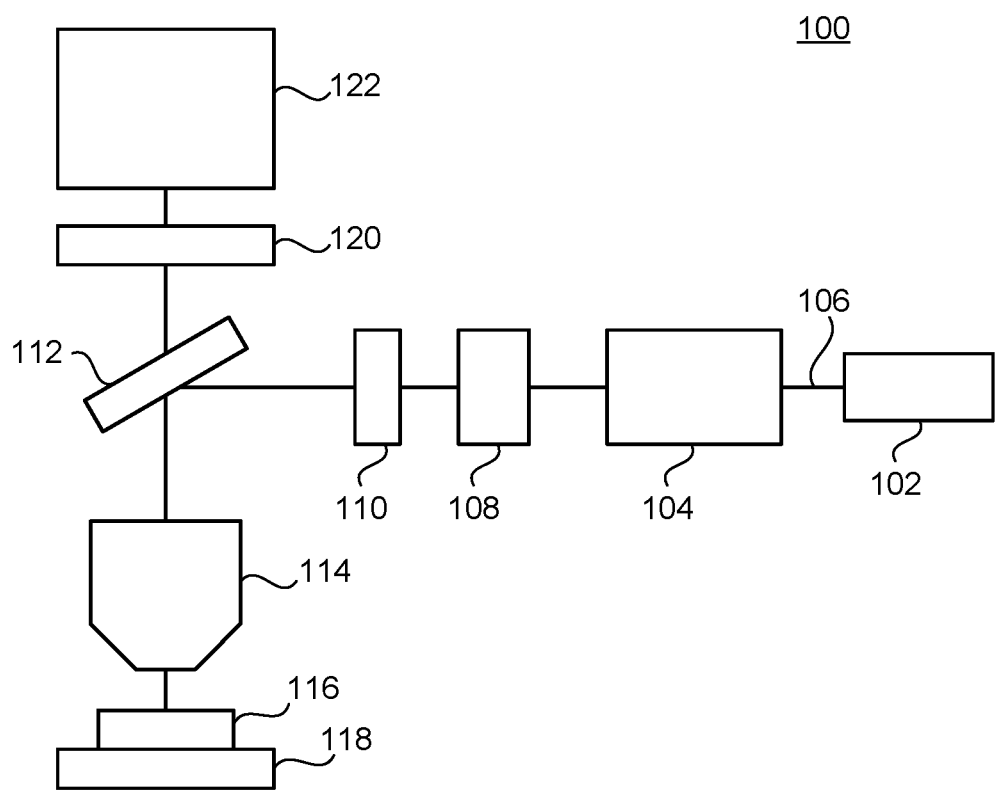
FIG. 1 is a schematic view of an example system that can facilitate structured illumination microscopy (SIM) and in which a phase selector is placed after a reflective component.

This document describes examples of systems and techniques that can provide structured illumination, including, but not limited to, by facilitating structured illumination microscopy (SIM). Such systems/techniques can provide one or more advantages over existing approaches, for example as will be described below.

Imaging (e.g., using SIM) can be performed to analyze a sample of any of multiple materials. In some implementations, SIM imaging or another type of imaging can be performed as part of biological or chemical analysis, such as a process of sequencing genetic material. In one example, the process can be a DNA sequencing process, e.g., sequencing-by-synthesis or next-generation sequencing (also known as high-throughput sequencing). In another example, the process may be used to enable genotyping. As one skilled in the art will know, genotyping involves determining differences in the genetic make-up (genotype) of an individual by examining the individual's DNA sequence using biological assays and comparing it to another individual's sequence or a reference sequence. Such processes can involve fluorescent imaging, where a sample of genetic material is subjected to light (e.g., a laser beam) to trigger a fluorescent response by one or more markers on the genetic material. Some nucleotides can have fluorescent tags associated with the nucleotide to fluoresce responsive to exposure to the energy source. A wavelength of the fluorescent response can be used to determine the presence of a corresponding nucleotide. Fluorescent responses can be detected over the course of the sequencing process and used to build a record of nucleotides in the sample.

SIM imaging is based on spatially structured light. For example, the structure can consist of or include a pattern in the illuminating light that helps increase the resolution of the obtained image(s). In some implementations, the structure can include patterns of fringes. Fringes of light can be generated by impinging a light beam on a diffraction grating (referred to as a grating for simplicity) such that reflective or transmissive diffraction occurs. The structured light can be impinged on the sample, illuminating the sample according to the respective fringes which may occur according to some periodicity. For example, images of the sample can be acquired at different phases of the fringes in the structured light, sometimes referred to as the respective pattern phases of the images. This can allow various locations on the sample to be exposed to a multitude of illumination intensities. The pattern of the structured light can be rotated relative to the sample, and the images just mentioned can be captured for each of the rotation angles.

Different types of gratings can be used in various implementations. The grating(s) can include one or more forms of periodic structure. In some implementations, the gratings can be formed by removing or omitting physical material from a substrate. In other implementations, optical filters or other non-physical materials may be implemented to form the gratings. For example, the substrate can be provided with a set of slits and/or grooves therein to form the grating. In some implementations, the grating can be formed by adding material to the substrate. For example, periodically spaced structures can be formed on the substrate by the same or a different material.

With a SIM system, it can be preferable that the system is capable of rapidly processing samples so as to facilitate a high throughput. Faster SIM imaging can enable a greater throughput of the analysis system. That is, more chemical or biological samples can be imaged over the same time period. For high throughput, the system may illuminate a relatively large area of the sample with high-contrast fringes and/or rapidly switch between fringe orientations. For such a system to achieve a high throughput, the imaging should therefore be highly repeatable and reliable. High optical power may be useful to keep exposure times relatively short. As such, good optical efficiency and a powerful light source may be useful to achieve a high optical power.

In some SIM systems that project high-contrast fringes, a coherent light source may be used. In such systems, a single-mode laser may be such a coherent light source, but may be cost prohibitive in the context of the type of analysis being done and/or the amount of power required. Other types of light sources such as a light-emitting diode (LED) or an arc lamp may not provide sufficient coherence for the application. Thus, a multimode laser can be a viable candidate as a coherent light source but is associated with the characteristic of having spectral multimode patterns. To achieve a desired uniformity with a multimode laser, the multimode laser output can be mode-scrambled. However, use of mode-scrambled multimode lasers can result in multiple light sources to selectively excite multiple gratings unless an optical switch is used, which may increase cost and optical system complexity. In addition, use of mode-scrambled multimode lasers may also result in reliance on a relay lens system to obtain zero-order blocking for a desired fringe frequency and modulation contrast.

Described herein are implementations of structured illumination systems for analyzing samples, some such systems including a single light source, at least two fixed gratings, and a mechanism for directing the entire beam from the light source onto one or the other of the gratings. A phase selector can be used for choosing the pattern phase. The mechanism can include either of a rotary double-sided mirror, non-rotating mirrors, or a rotatable prism mirror, to name a few examples. With a rotary double-sided mirror, a blade of the mirror can be placed in a first position for reflection only onto the first grating, and can be placed in a second position for reflection only onto the second grating. A non-rotating mirror can translate into the first or second positions. A rotatable prism mirror can selectively direct light from the light source onto the first or second grating.

The examples described herein can provide advantages compared to previous approaches. In some implementations, a rotatable mirror can be used to switch between excitation of the respective gratings. Such a rotatable mirror can switch between two optical paths using a single light source. In addition, such a rotatable mirror can be sized such that errors in rotational position and/or thermal effects do not appreciably alter the optical paths. Reduction of the effect of such rotational variations and/or thermal effects on the optical paths can allow the SIM imaging system to operate faster as the component moving the rotatable mirror (e.g., a motor) can operate faster as there is less reliance on fine tuning of the positioning compared to systems that implement moveable gratings or other components. If more than two optical paths are to be implemented, multiple rotatable mirrors can be implemented for a multiple optical paths. In some implementations, the gratings may be fixed in place rather than gratings that rotate, translate, or otherwise move as part of operation. This can provide angle precision and stability, to name just two examples, as the gratings also do not require fine positional tuning. In some implementations, a single light source may be used as the rotatable mirror can be rotated into or out of a respective light path to block or unblock a corresponding light path from the single light source. By implementing the selectively positionable reflective component with the optical subsystem of a SIM system, mode-blocking may be omitted for the multimode laser and the entire path of light may be either transmitted or blocked. Such a system can also eliminate having the orders of light emitted from a grating be separable from each other at some particular stage of the system (e.g., to require the orders of light to be in focus at some stage where one or more orders are blocked, and one or more orders are allowed to propagate). That is, a grating can emit light that is not diffracted and that is referred to as light of order 0, and also emit diffracted light that propagates on opposite sides of the 0-order light and is referred to as light of orders +/−1, respectively. In a system that uses order-blocking, the orders 0 and +/−1 of light can all be in focus at a blocking stage where, say, the 0-order light is blocked and the orders +/−1 are not blocked. In systems that do not use order-blocking, some or all of the orders of light can come into focus elsewhere in the system (e.g., at an objective lens), and such a system can have a shorter optical path length. In addition, such a system with a selectively positionable reflective component may omit an optical switch, thereby reducing the components and complexity of the optical system. Moreover, such a system can increase the overall compactness; for example, by omitting a relay lens system that facilitates recombining multiple grating paths.

FIG. 1 schematically shows an example of a system 100 that can facilitate SIM imaging. The system 100 can be used in combination with one or more other examples described herein. Some components in this and other examples are shown conceptually as a block or other generic component; such component(s) can be implemented in form of one or more separate or integrated components so as to perform the indicated function(s).

The system 100 includes a light source 102. The light source 102 can be selected based on the coherence and/or power output for which the system 100 is to be implemented. For example, a multimode laser can be used as the light source 102.

The system 100 includes a light-structuring component 104 that receives light from the light source 102. In some implementations, the light-structuring component 104 facilitates that the received light impinges on one or more gratings so as to generate a pattern of light fringes. For example, one or more reflective components can be used for directing the light onto the proper grating and/or to further guide the light toward a next stage in the system 100. Examples of the light-structuring component 104 are described below. A beam 106 extending between the light source 102 and the light-structuring component 104 schematically illustrates the propagation of light. The light-structuring component 104 can generate structured light and provide the structured light to a subsequent component in the system 100.

In some implementations, the subsequent component is a phase selector 108 in the system 100. The phase selector 108 can receive light from the light-structuring component 104. In some implementations, the phase selector 108 is used for selecting the pattern phase at which an image will be captured. For example, the phase selector 108 can facilitate selecting among multiple candidate pattern phases according to a desired illumination of the sample or to a required degree of resolution, as described in greater detail herein.

The system 100 includes a projection lens 110 that can receive light from the phase selector 108. Such light can be referred to as phase-selected light to indicate that the light corresponds to a selection of the particular pattern phase(s) having been done, such as by way of the phase selector 108. The projection lens 110 can include one or more optical elements such as lenses that condition the phase-selected light before it impinges on a next stage in the system 100.

The system 100 includes a mirror 112 that at least partially reflects light from the projection lens 110 toward an objective lens 114. In some implementations, the mirror 112 provides selective transmission, such as to reflect some part(s) of illuminating light arriving from the projection lens 110 and to transmit at least some part of imaging light arriving at the mirror 112 from the objective lens 114. For example, the mirror 112 can be a dichroic mirror.

The objective lens 114 receives illumination light from the mirror 112. The objective lens 114 can include one or more optical elements such as lenses that condition light from the projection lens 110 (as reflected by the mirror 112) before light impinges on a next stage in the system 100.

The objective lens 114 directs light onto a sample 116. In some implementations, the sample 116 includes one or more materials to be analyzed. For example, the sample 116 can include genetic material to be illuminated for detection of fluorescent responses. The sample 116 can be held on a suitable substrate, including, but not limited to, a flowcell that allows liquids or other fluids to selectively be flowed relative to the sample. For example, the sample 116 can be subjected to reagent containing one or more nucleotides prior to illumination and thereafter image capturing and analysis.

The sample 116 can be held by a stage 118 in the system 100. The stage 118 can provide one or more types of manipulation relative to the sample 116. In some implementations, physical movement of the sample 116 can be provided. For example, the stage 118 can translationally and/or rotationally reposition the sample 116 relative to at least one other component of the system 100. In some implementations, thermal treatment of the sample 116 can be provided. For example, the stage 118 can heat and/or cool the sample 116.

Phase selection can be facilitated by the stage 118. In some implementations, the stage 118 can translate the sample 116 a distance relative to stationary light fringes to accomplish phase selection (e.g., using a piezo actuator in the stage 118). For example, the phase selector 108 can then be bypassed in, or eliminated from, the system 100.

That is, light originating in the light source 102, conditioned in the described components, can be directed at the sample 116 for illumination after propagating through the objective lens 114. Any light emitted by the sample 116 can traverse the objective lens 114 in an opposite direction and partially or entirely be transmitted through the mirror 112. The system 100 can include a filter component 120 receiving light from the objective lens 114 through the mirror 112. The filter component 120 can filter such light in one or more ways. For example, the filter component 120 can pass through some particular wavelength(s) and/or block (or reflect) some other particular wavelength(s). In some implementations, the mirror 112 can incorporate the filter component 120 as part of the mirror, such as by positioning the filter component 120 on a rear surface of the mirror 112.

Light traversing the filter component 120 can enter a camera system 122 in the system 100. The camera system 122 can include one or more image sensors capable of detecting electromagnetic radiation of the kind(s) relevant to the analysis to be performed. In some implementations, the camera system 122 is configured for capturing images using fluorescent light. For example, the camera system 122 can include a charge-coupled device, a complementary metal-oxide semiconductor device, or other image capture device. The camera system 122 can generate output in digital and/or analog form. For example, data corresponding to an image captured by the camera system 122 can be stored by the camera system 122 or can be sent to a separate component (e.g., a computer system or other device) for storage and/or analysis.

Operation of the system 100 or other apparatuses or machines will be exemplified below. In some implementations, the light-structuring component 104 includes one or more reflective components and at least one grating. For example, the reflective component can redirect light toward, or arriving from, the grating(s) to generate light that is conditioned so as to provide one or more forms of illumination of the sample 116. In some implementations, the light-structuring component 104 can condition the light from the light source 102 to perform SIM imaging. For example, such structured light may not need to be in focus at a particular position within the light-structuring component 104; rather, the structured light (e.g., fringes of a diffraction pattern) can be focused at another stage of the system 100, including, but not limited to, at a back of the objective lens 114.

Figure 2:
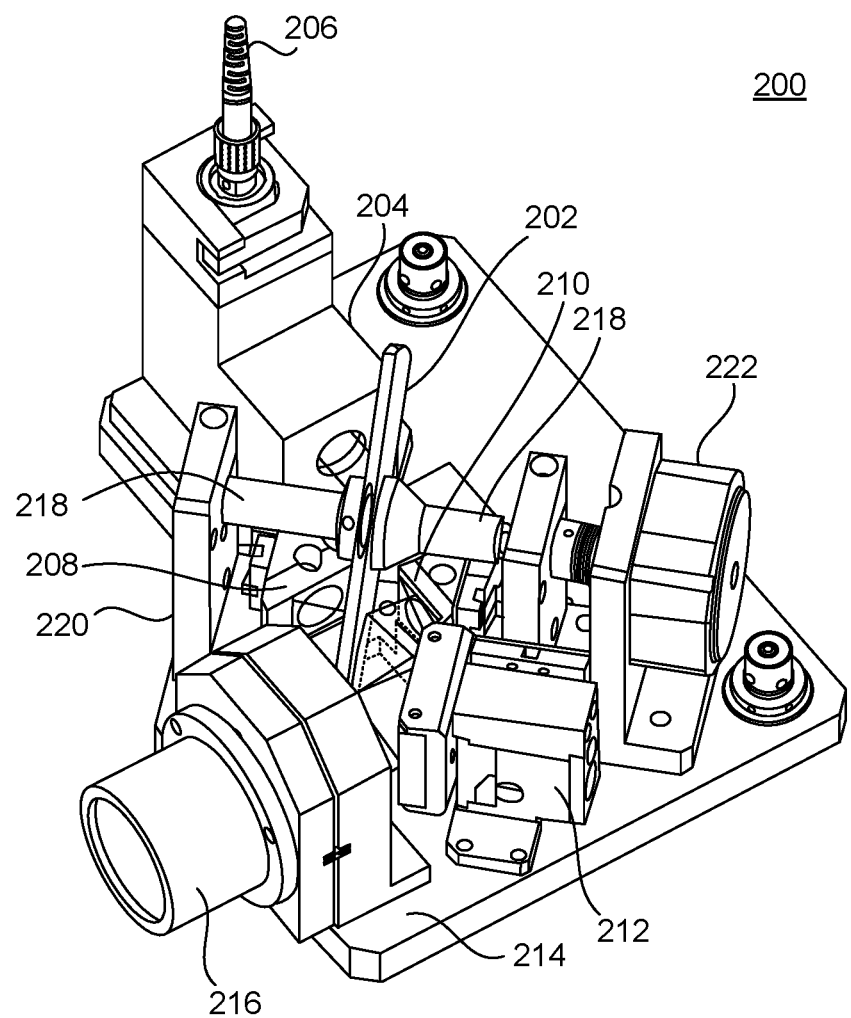
FIG. 2 shows an example of a rotating inline grating system (RIGS) having a rotatable mirror that may be implemented as part of the system of FIG. 1.

FIG. 2 shows an example of a system 200 having a rotatable mirror 202. The system 200 can be used in combination with one or more other examples described herein. An individual component of the system 200 can perform a similar or identical function to a corresponding component described with reference to another example in this description.

The system 200 includes a light source 204. In some implementations, the light source 204 provides light that it in turn receives through at least one fiber optic cable 206. For example, the light source 204 and the fiber optic cable 206 can collectively be considered a fiber launch module.

The system 200 includes a grating 208 and a grating 210. In some implementations, the grating 208 and/or 210 can serve as a diffractive component with regard to light from the light source 204. For example, the grating 208 and/or 210 can comprise a substrate with a periodic structure, the substrate combined with a prism. The gratings 208 and 210 can be positioned relative to each other according to one or more arrangements. Here, the gratings 208 and 210 face each other in the system 200. The gratings 208 and 210 can be substantially identical to each other or can have one or more differences. The size, periodicity or other spatial aspect of one of the gratings 208 and 210 can differ from that/those of the other. The grating orientation (i.e., the spatial orientation of the periodic structure) of one of the gratings 208 and 210 can differ from that/those of the other. In some implementations, the respective grating orientations of the gratings 208 and 210, which gratings themselves face toward each other, can be substantially perpendicular to each other or at any other angle relative to each other. In some implementations, the gratings 208 and 210 can be at offset positions relative to the rotatable mirror 202. In some implementations, the gratings 208 and/or 210 can be in a fixed position relative to the light source 204.

The system 200 can include one or more components (e.g., as a phase selector 108 of FIG. 1) to facilitate phase selection with regard to the light that should be applied to a sample (e.g., to the sample 116 in FIG. 1). Here, the system 200 includes a piezo fringe shifter 212. In some implementations, the piezo fringe shifter 212 can receive light from the grating 208 and/or 210 and can perform phase selection with regard to some or all of that light. For example, the piezo fringe shifter 212 can be used for controlling the pattern phase of the structured light using which a particular image should be captured. The piezo fringe shifter 212 can include a piezo actuator. For example, a piezo piston system can be used to effectuate phase selection. Other approaches can be used. For example, a tilting optical plate can be used for phase selection. For example, the system 200 is here implemented on a board 214, and one or more areas of the board 214 can be tilted to accomplish phase selection. As another example, one or more of the gratings 208 and 210 can be moved (e.g., translated) for the phase selection, such as by a piezo actuator. Light emanating from the piezo fringe shifter 212 is sometimes referred to as phase-selected light, to indicate that the light has been conditioned according to a particular phase selection. In some implementations, the gratings 208 and/or 210 can be in a fixed position relative to the light source 204.

The system includes a projection lens 216 that can include one or more optical components (e.g., a lens) to condition light that is received from the piezo fringe shifter 212. For example, the projection lens 216 can control the characteristics of the light before the light enters an objective lens (e.g., the objective lens 114 in FIG. 1).

The rotatable mirror 202 can be used to redirect at least one beam of light toward, and/or arriving from, one or more of the gratings 208 or 210. The rotatable mirror 202 can include one or more materials so as to be sufficiently reflective of the electromagnetic waves with which the sample is to be illuminated. In some implementations, the light from the light source 204 includes a laser beam of one or more wavelengths. For example, a metal-coated mirror and/or a dielectric mirror can be used. The rotatable mirror 202 can be double-sided. For example, the rotatable mirror 202 can be considered double-sided if it is capable of performing reflection on at least part of both its sides (e.g., reflective at a first end for a first beam path and reflective at a second end, opposite the first end, for a second beam path).

The rotatable mirror 202 can include an elongate member. The rotatable mirror 202 can have any of a variety of form factors or other shape characteristics. The rotatable mirror 202 can have a generally flat configuration. The rotatable mirror 202 can have a substantially square or otherwise rectangular shape. The rotatable mirror 202 can have rounded corners. The rotatable mirror 202 can have a substantially constant thickness. The reflective surfaces of the rotatable mirror 202 can be substantially planar.

The rotatable mirror 202 can be supported by an axle 218 of the system 200. The axle 218 can allow the rotatable mirror 202 to be rotated about the axle 218 in either or both directions. The axle 218 can be made of a material with sufficient rigidity to hold and manipulate the rotatable mirror 202, such material(s) including, but not limited to, metal. The axle 218 can be coupled substantially at a center of the rotatable mirror 202. For example, the rotatable mirror 202 can have an opening at the center, or a cutout from one side that reaches the center, so as to facilitate coupling with the axle 218. As another example, the axle 218 can include separate axle portions that are coupled to respective faces of the rotatable mirror 202, without the need for any opening in the rotatable mirror 202. The axle 218 can have at least one suspension 220. Here, the suspension 220 is positioned at the ends of the axle 218 on both sides of the rotatable mirror 202. The suspension 220 can include a bearing or other feature that facilitates low-friction operation.

The rotatable mirror 202 can be actuated to assume one or more positions. Any form of motor or other actuator can be used for controlling the rotatable mirror 202. In some implementations, a stepper motor 222 is used. The stepper motor 222 can be coupled to the axle 218 and be used for causing the axle 218, and thereby the rotatable mirror 202, to rotate and assume the desired position(s). In some implementations, the rotatable mirror 202 rotates in the same direction toward the new positions (e.g., always clockwise, or always counter-clockwise, about the rotation axis of the axle 218). In some implementations, the rotatable mirror 202 reciprocates between two or more positions (e.g., alternatingly clockwise or counter-clockwise, about the rotation axis of the axle 218).

Figure 3A:
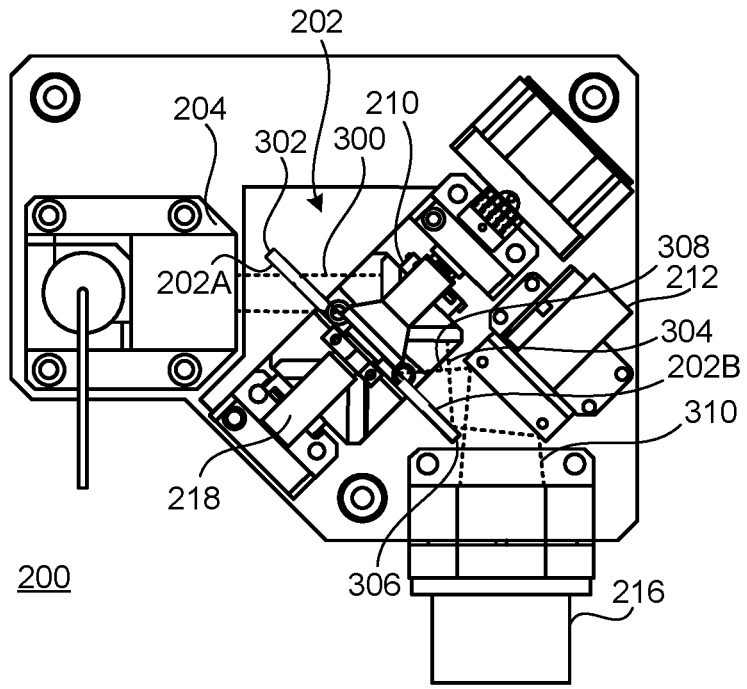
FIG. 3A is a top view of the system of FIG. 2 showing the rotatable mirror in a first position.
Figure 3B:
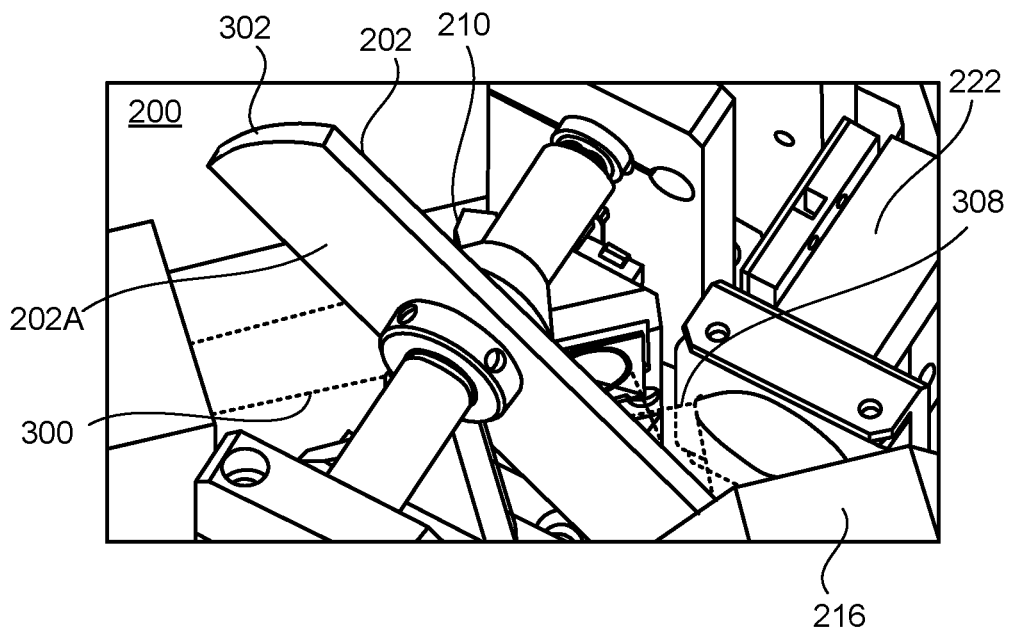
FIG. 3B is a perspective detailed view of the rotatable mirror in the first position shown in FIG. 3A.

FIGS. 3A-B show an example relating to the system 200 in FIG. 2. FIG. 3A shows the system 200 in a top view, and FIG. 3B shows the system 200 in a perspective view. The rotatable mirror 202 is in the same position in each of FIGS. 3A-B.

The light source 204 here generates light 300 that propagates toward the grating 210. The rotatable mirror 202 is positioned (e.g., oriented about the rotational axis of the axle 218) so that a first end 302 of the rotatable mirror 202 does not interrupt the light 300. Currently, the first end 302 may be positioned closer to the viewer than is the light 300 which may propagate in the plane of the drawing. That is, a reflective surface 202A of the rotatable mirror 202 that faces toward the light source 204 currently does not interrupt the light 300 because the first end 302 does not block the path of the light 300. The light 300 therefore propagates (through air, vacuum, or another fluid) until reaching the grating 210.

The light 300 interacts with the grating 210 in one or more ways. In some implementations, the light 300 undergoes diffraction based on the grating 210. Here, light 304 is structured light (e.g., having one or more pattern fringes) that emanates from the grating 210 based on the interaction therewith by the light 300. The light 304 initially propagates substantially in a direction generally toward the projection lens 216. However, the position of the rotatable mirror 202 is such that a second end 306 of the rotatable mirror 202 does interrupt the light 304. The second end 306 can be opposite the first end 302. In some implementations, the first end 302 and the second end 306 can be positioned at any angle relative to each other, such as any angle between 0 degrees and 180 degrees. Currently, the second end 306 may be positioned about as close to the viewer as is the light 304. That is, a reflective surface 202B of the rotatable mirror 202 that faces toward the grating 210 does interrupt the light 304 because the second end 306 blocks the path of the light 304. From the light 304, the rotatable mirror 202 therefore directs light 308 toward the piezo fringe shifter 212.

The piezo fringe shifter 212 performs phase selection on the light 308. For example, the piezo fringe shifter 212 selects the pattern phase to which the sample is to be subjected in the present illumination (e.g., for purposes of capturing one or more particular images). Light 310 emanates from the piezo fringe shifter 212 and propagates toward, and enters, the projection lens 216. The light 310 corresponds to a specific phase selection made using the piezo fringe shifter 212. The light 310 can therefore be characterized as phase-selected light. The light 310 can then continue to propagate through the system (e.g., as in the system 100 in FIG. 1), for example to illuminate the sample 116.

Here, the characteristics of the phase-selected electromagnetic waves of the light 310 correspond to the fact that the light 300 is diffracted by the grating 210 and that phase-selection is performed by the piezo fringe shifter 212. The involvement of the grating 210, moreover, was here a result of the positioning of the rotatable mirror 202 so that the second end 306 thereof interrupted the light 304, whereas the first end 302 did not interrupt the light 300.

Figure 4A:
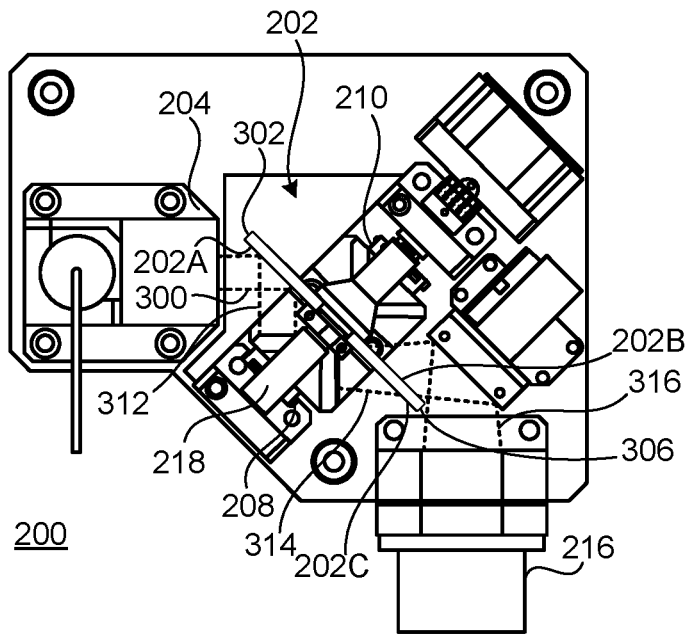
FIG. 4A is a top view of the system of FIG. 2 showing the rotatable mirror in a second position.
Figure 4B:
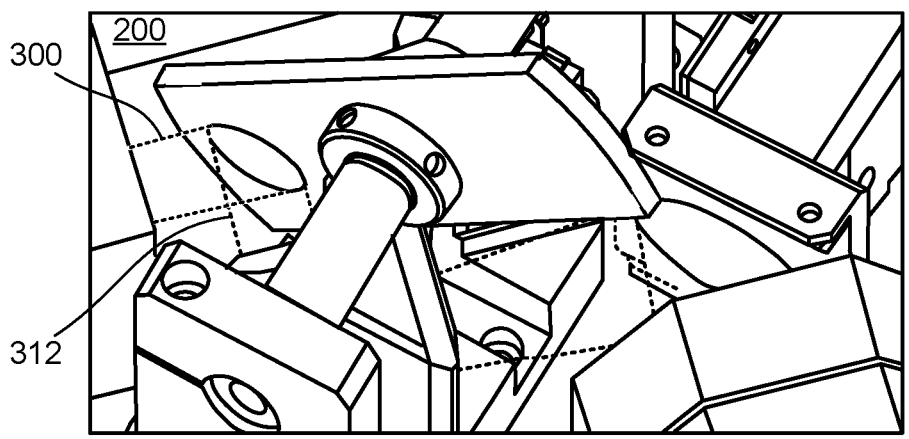
FIG. 4B is a perspective detailed view of the rotatable mirror in the second position shown in FIG. 4A.

Assume now that the rotatable mirror 202 instead is placed in a different position. FIGS. 4A-B show another example relating to the system 200 in FIG. 2. FIG. 4A shows the system 200 in a top view, and FIG. 4B shows the system 200 in a perspective view. The rotatable mirror 202 is in the same position in each of FIGS. 4A-B.

The light source 204 here generates the light 300 that initially propagates toward the grating 210. The rotatable mirror 202 is positioned (e.g., oriented about the rotational axis of the axle 218) so that the first end 302 of the rotatable mirror 202 does interrupt the light 300. Currently, the first end 302 may be positioned about as close to the viewer as is the light 300. That is, the reflective surface 202A of the rotatable mirror 202 that faces toward the light source 204 does interrupt the light 300 because the first end 302 blocks the path of the light 300. Light 312 therefore propagates (through air, vacuum, or another fluid) until reaching the grating 208.

The light 312 interacts with the grating 208 in one or more ways. In some implementations, the light 312 undergoes diffraction based on the grating 208. Here, light 314 is structured light (e.g., having one or more pattern fringes) that emanates from the grating 208 based on the interaction therewith by the light 312. The light 314 propagates substantially in a direction toward the piezo fringe shifter 212. The position of the rotatable mirror 202 is such that the second end 306 of the rotatable mirror 202 does not interrupt the light 314. Currently, the second end 306 may be positioned closer to the viewer than is the light 314. That is, neither the reflective surface 202B of the rotatable mirror 202, nor a reflective surface 202C that faces toward the grating 208, currently interrupts the light 314 because the second end 306 does not block the path of the light 314. The light 314 therefore propagates until reaching the piezo fringe shifter 212.

The piezo fringe shifter 212 performs phase selection on the light 314. For example, the piezo fringe shifter 212 selects the pattern phase to which the sample is to be subjected in the present illumination (e.g., for purposes of capturing one or more particular images). Light 316 emanates from the piezo fringe shifter 212 and propagates toward, and enters, the projection lens 216. The light 316 corresponds to a specific phase selection made using the piezo fringe shifter 212. The light 316 can therefore be characterized as phase-selected light. The light 316 can then continue to propagate through the system (e.g., as in the system 100 in FIG. 1), for example to illuminate the sample 116.

Here, the characteristics of the phase-selected electromagnetic waves of the light 316 correspond to the fact that the light 300 is diffracted by the grating 208 and that phase-selection is performed by the piezo fringe shifter 212. The involvement of the grating 208, moreover, was here a result of the positioning of the rotatable mirror 202 so that the first end 302 thereof interrupted the light 300, whereas the second end 306 did not interrupt the light 314. The rotatable mirror 202 can be caused to repeatedly assume different positions (e.g., the ones of FIGS. 3A-B and FIGS. 4A-B, respectively) by various rotations. For example, the rotatable mirror 202 can reciprocate between the FIGS. 3A-B position and the FIGS. 4A-B position. As another example, the rotatable mirror 202 can rotate in the same direction (e.g., clockwise or counter-clockwise, from the perspective of the stepper motor 222) to repeatedly assume the FIGS. 3A-B position and the FIGS. 4A-B position.

As mentioned above, the gratings 208 and 210 can have different grating orientations with respect to each other. For example, the gratings 208 and 210 can have grating orientations that are substantially perpendicular to each other. The light 304 (FIG. 3A), emanating from the grating 210, and the light 314 (FIG. 4A), emanating from the grating 208, can therefore have different characteristics. For example, the pattern of fringes can be different in one of the lights 304 and 314 than in the other. Illuminating the sample (e.g., the sample 116 in FIG. 1) with differently structured light can facilitate use of the system 200 for SIM imaging.

The above examples illustrate a system that includes a light source (e.g., the light source 204); a first grating (e.g., the grating 210) and a second grating (e.g., the grating 208); a phase selector (e.g., the piezo fringe shifter 212); and at least one reflective component (e.g., the rotatable mirror 202). In a first position (e.g., as shown in FIGS. 3A-B) the reflective component forms a first light path from the light source to the first grating (e.g., by the first end 302 not interrupting the light 300) and thereafter to the phase selector (e.g., by the second end 306 blocking the light 304). In a second position (e.g., as shown in FIGS. 4A-B), the reflective component forms a second light path from the light source to the second grating (e.g., by the first end 302 blocking the light 300) and thereafter to the phase selector (e.g., by the second end 306 not interrupting the light 304).

The above examples also illustrate a system that includes a light source (e.g., the light source 204); a first grating (e.g., the grating 208) and a second grating (e.g., the grating 210); a phase selector (e.g., the piezo fringe shifter 212); and at least one mirror (e.g., the rotatable mirror 202). Particularly, the mirror has a first position (e.g., as shown in FIGS. 4A-B) that interrupts (e.g., by the first end 302) a first path from the light source to the second grating, while not interrupting (e.g., by the second end 306 not blocking the light 314) a second path from the first grating to the phase selector. The mirror has a second position (e.g., as shown in FIGS. 3A-B) that interrupts (e.g., by the second end 306) a third path from the second grating and directs second light (e.g., the light 308) toward the phase selector, while not interrupting the first path (e.g., by the first end 302 not blocking the light 300).

Examples herein relate to using a reflective component and one or more gratings to provide structured light which can be used for SIM imaging. In some implementations, the mechanical motion can be significant (e.g., by rotating a mirror or another reflective component). However, reasonable mechanical and motion tolerances can be provided. For example, less or no precision may be needed regarding the start or stop positions of a reflective component (e.g., a mirror or a prism mirror); and stability and repeatability can be provided (e.g., with a rotatable mirror) by using precision bearings (e.g., in the suspension 220), a precision spindle (e.g., in the axle 218), and/or an accurate mirror (e.g., with the rotatable mirror 202 having low runout and/or good flatness). The stability and repeatability may be made independent of parts that can wear out (e.g., guide ways and/or end stops).

Figure 5:
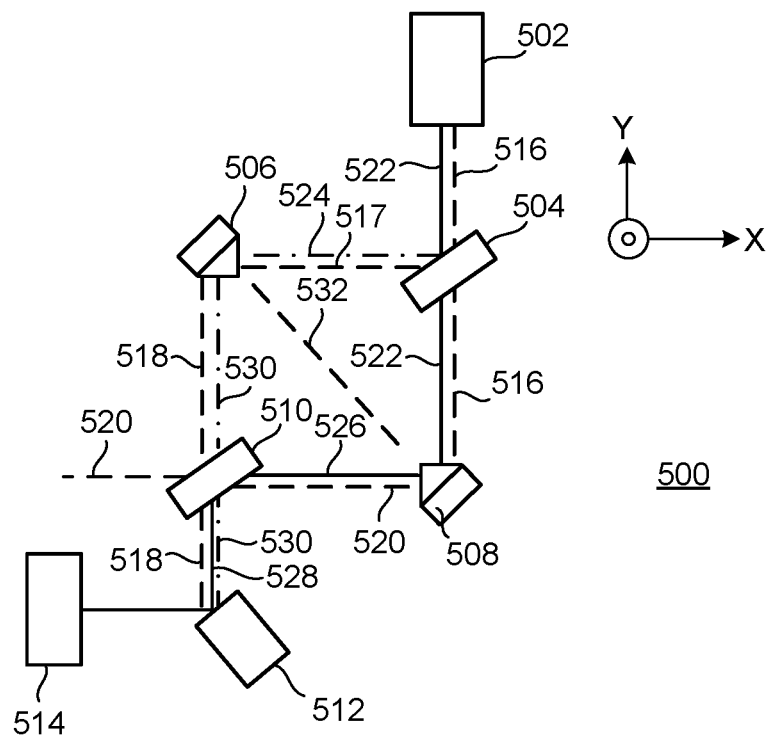
FIG. 5 is a schematic view of a system having one or more mirrors that may be implemented as part of the system of FIG. 1 to facilitate SIM.

FIG. 5 schematically shows another example of a system 500 that can be used as part of a SIM imaging system. The system 500 can be used in combination with one or more other examples described herein. The system 500 includes a light source 502, a mirror 504, a grating 506 and a grating 508, a mirror 510, a phase selector 512, and a projection lens 514. An individual component of the system 500 can perform a similar or identical function to a corresponding component described with reference to another example in this description. Here, the gratings 506 and 508 face toward each other. In some implementations, the gratings 506 and 508 can have different grating orientations, including, but not limited to, ones that are substantially perpendicular to each other or at any other angle relative to each other. In some implementations, the gratings 506 and 508 can be at offset positions relative to the mirror 504 and/or mirror 510.

A Cartesian coordinate system having respective x-, y- and z-axes is shown. Here, the x- and y-axes extend in the plane of the illustration, and the z-axis extends perpendicularly to the x- and y-axes in a direction toward the viewer.

A path 516 is marked between the light source 502 and the grating 508. In this and other examples, a path can indicate the way that a light beam can travel unless it is interrupted by some structure. A path 517 is marked between the mirror 504 and the grating 506. A path 518 is marked between the grating 506 and the phase selector 512. A path 520 is marked from the grating 508 extending, in this example, to the side of the projection lens 514. The paths 516, 517, 518, 520 are here illustrated using dashed lines.

The light source 502 here generates light 522 along at least part of the path 516. If the position of the mirror 504 is such that the mirror 504 does not interrupt the path 516 and does not block the light 522, then the light 522 can propagate along the path 516 and reach the grating 508. That is, the mirror 504 can then be considered as forming a light path of the light 522, the light path extending from the light source 502 to the grating 508. On the other hand, if the position of the mirror 504 is such that the mirror 504 interrupts the path 516 and blocks the light 522, then the mirror 504 can reflect the light 522, and light 524 can propagate along the path 517 toward the grating 506. The redirected light 524 is here indicated by a dot-dash line. That is, the mirror 504 can then be considered as forming a light path of the light 522 and the light 524, the light path extending from the light source 502 to the grating 506. Thus, the mirror 504 can selectively redirect the light 522 from the light source 502 between two paths toward a selected one of the gratings 506 or 508 based on the position of mirror 504.

The mirror 510 can selectively redirect light from a selected one of the gratings 506 or 508 toward the phase selector 512 based on the position of mirror 510. If the mirror 504 does not interrupt the path 516 such that light 526 is emanating from the grating 508 and the position of the mirror 510 is such that the mirror 510 interrupts the path 520 and blocks light 526 emanating from the grating 508, then the mirror 510 can reflect light 528 toward the phase selector 512. That is, the mirrors 504 and 510 can then be considered as cooperatively forming a light path of the light 522, the light 526 and the light 528, the light path extending from the light source 502 to the phase selector 512. On the other hand, if the mirror 504 does interrupt the path 516 such that light 524 is redirected toward the grating 506 and the position of the mirror 510 is such that the mirror 510 does not interrupt the path 518 and does not block light 530, then the light 530 can propagate along the path 518 and reach the phase selector 512. The light 530 is here indicated by a dot-dash line. That is, the mirrors 504 and 510 can then be considered as cooperatively forming a light path of the light 522, the light 524, and the light 530, the light path extending from the light source 502 to the phase selector 512.

The paths 516, 517, 518 and 520 can define one or more planes depending on the orientation of the components of the system 500. Here, the light path that includes the light 522, the light 526 and the light 528 extends substantially in the x-y-plane as illustrated (e.g., in the plane of the drawing). Similarly, the light path that includes the light 522, the light 524 and the light 530 also extends substantially in the x-y-plane. At least one aspect of the system 500 can be substantially aligned with one or more such planes. In some implementations, the mirrors 504 and 510 are part of a rotatable mirror (e.g., the rotatable mirror 202 in FIG. 2). For example, such a rotatable mirror can revolve at least partially about an axis 532 here schematically indicated between the mirrors 504 and 510. The axis 532 can be substantially parallel to the plane of one or more of the light paths. For example, the axis 532 can be offset from the plane in some direction (e.g., toward the viewer, similar to the positioning of the axle 218 in FIG. 2). In some implementations, one or more of the lights 522, 524, 526, 528, and/or 530 can propagate along a plane forming an angle relative to the x-y plane (i.e., in a direction toward or away from the viewer) so as to form a light path having components in the x-, y-, and z-axes.

Figure 6:
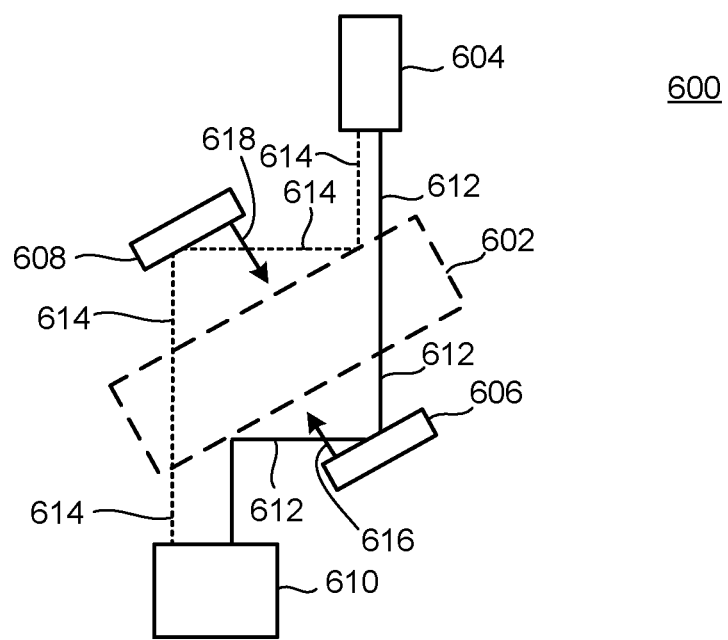
FIG. 6 is a schematic view of an example system having a translatable mirror that may be implemented as part of the system of FIG. 1.

FIG. 6 schematically shows an example of a system 600 having a translatable mirror 602. The translatable mirror 602 is here schematically illustrated using a dashed outline. Examples of the translatable mirror 602 will be given below. The system 600 can be used in combination with one or more other examples described herein. The system 600 includes a light source 604, a grating 606 and a grating 608, and a phase selector 610. An individual component of the system 600 can perform a similar or identical function to a corresponding component described with reference to another example in this description.

The translatable mirror 602 can include one or more mirrors that can undergo translation (in one or more directions) as part of the operation of the system 600. The translatable mirror 602 can be translated into a first position where the translatable mirror 602 forms a light path 612 from the light source 604 to the grating 606 and thereafter to the phase selector 610. The translatable mirror 602 can be translated into a second position where the translatable mirror 602 forms a light path 614 from the light source 604 to the grating 608 and thereafter to the phase selector 610. Thus, the translatable mirror 602 can selectively redirect the light from the light source 604 between the two light paths 612 and 614 toward the phase selector 610.

The gratings 606 and 608 can be placed in any of various positions relative to each other. The orientation of the grating 606 can be characterized using a normal 616 of the grating 606. For example, the normal 616 can be a vector defined to be perpendicular to an optically active surface of the grating 606. The orientation of the grating 608 can be characterized using a normal 618 of the grating 608. For example, the normal 618 can be a vector defined to be perpendicular to an optically active surface of the grating 608. In some implementations, the normals 616 and 618 are substantially aligned with each other. For example, the normals 616 and 618 can be substantially antiparallel to each other (e.g., oriented toward each other). In other implementations, the normals 616 and 618 can form an angle between the normals 616 and 618.

The light paths 612 and 614 can define one or more planes depending on the orientation of the components of the system 600. Here, each of the light paths 612 and 614 extends substantially in the plane of the drawing. In other implementations, the light paths 612 and/or 614 can have one or more portions that extend out of or in to the plane of the drawing. At least one aspect of the system 600 can be substantially aligned with one or more such planes of the light paths 612 or 614. In some implementations, the translatable mirror 602 can undergo translation that is substantially perpendicular to the plane of the light paths 612 and 614. In some implementations, the translatable mirror 602 can undergo translation that is substantially parallel to the plane of the light paths 612 and 614. Combinations of these approaches can be used. In some implementations, a first side of the translatable mirror 602 can have a first reflective angle (e.g., to form light path 612) and a second side of the translatable mirror 602 can have a second reflective angle (e.g., to form light path 614), where the first reflective angle is different from the second reflective angle.

Figure 7A:
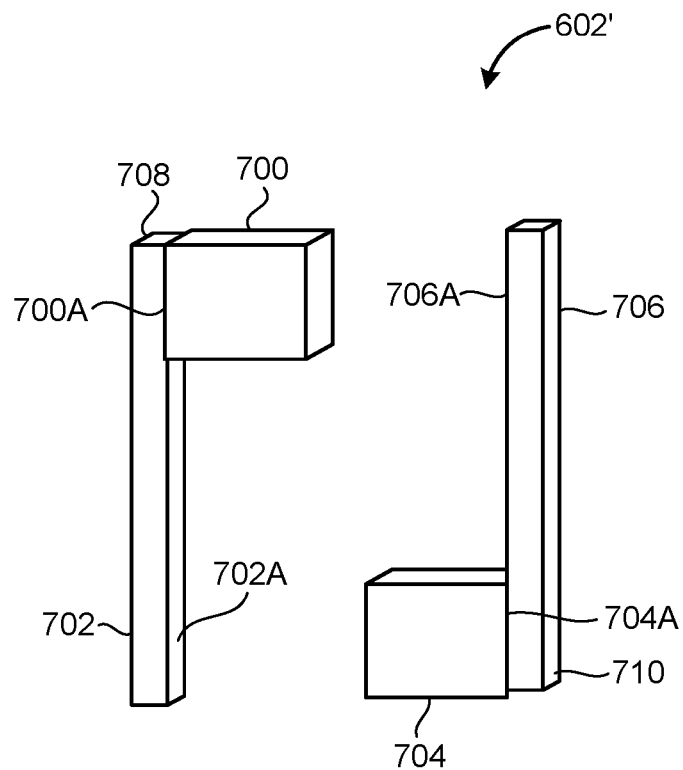
FIGS. 7A-B schematically show an example of vertically translating mirrors that may be implemented as part of the system in FIG. 6.
Figure 7B:
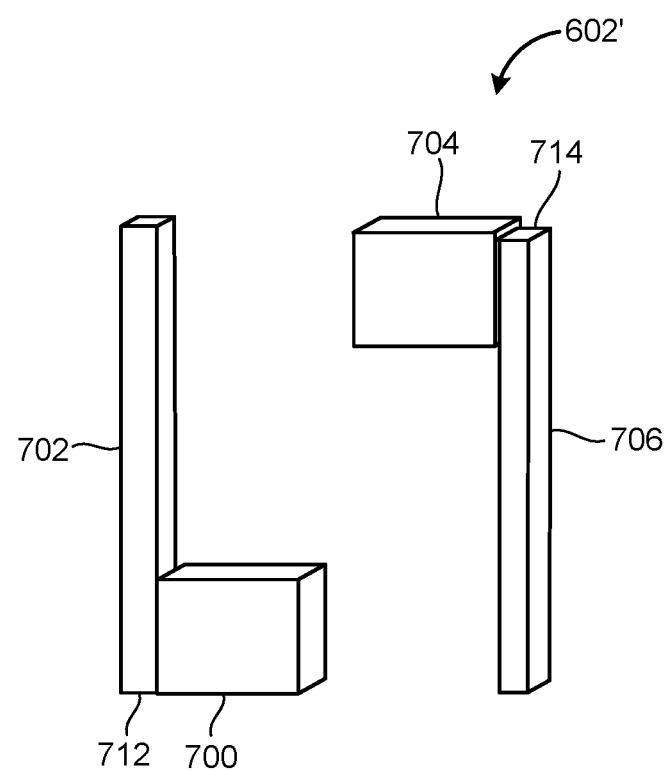

FIGS. 7A-B schematically show an example relating to the system 600 in FIG. 6. The described examples can be used in combination with one or more other examples described herein. A translatable mirror 602' is here schematically illustrated. The translatable mirror 602' can be used as, or as part of, the translatable mirror 602 in FIG. 6. That is, a pair of mirrors 700 and 704 when in a first translated position shown in FIG. 7A can form light path 614 and the pair of mirrors 700 and 704 when in a second translated position shown in FIG. 7B can form light path 612. The translatable mirror 602' includes a mirror 700 coupled to a track 702. Here, the mirror 700 has a rectangular shape and a side 700A of the mirror 700 faces a side 702A of the track 702. The track 702 can facilitate translation of the mirror 700 vertically along the side 702A. For example, an actuator (not shown) can act on the mirror 700 and relocate it in either direction along the track 702. Similarly, the translatable mirror 602' includes a mirror 704 having a rectangular shape and coupled to a track 706 so that a side 704A of the mirror 704 faces a side 706A of the track 706. Accordingly, the track 706 can facilitate translation of the mirror 704 vertically along the side 706A. More than one track can be used for translation of the mirror 700 and/or 704. Other types of actuation can be used. For example, the mirror 700 and/or 704 can be manipulated by an actuator.

FIG. 7A shows a configuration of the translatable mirror 602' with the mirror 700 positioned toward an end 708 of the track 702, and the mirror 704 positioned toward an end 710 of the track 706. In some implementations, the position in FIG. 7A can correspond to the formation of one or more light paths. For example, with reference again also to FIG. 6, the position of the mirror 704 toward the end 710 can facilitate interruption of the light path 612 between the light source 604 and the grating 606. Due to the blocking, the mirror 704 can serve to redirect light from the light source 604 toward the grating 608 and in so doing can form the light path 614. The mirror 700, moreover, which is currently positioned toward the end 708, may not interrupt the light path 614 between the grating 608 and the phase selector 610. As such, the translation of the translatable mirror 602' into the shown configuration can form the light path 614 in the system 600.

FIG. 7B shows a configuration of the translatable mirror 602' with the mirror 700 positioned toward an end 712 of the track 702, and the mirror 704 positioned toward an end 714 of the track 706. The end 712 is here substantially opposite the end 708, and the end 714 is here substantially opposite the end 710. In some implementations, the position in FIG. 7B can correspond to the formation of one or more light paths. For example, with reference again also to FIG. 6, the position of the mirror 704 toward the end 714 may not interrupt the light path 612 from the light source 604, and the light may therefore reach the grating 606. The mirror 700, moreover, which is currently positioned toward the end 712, may interrupt the light path 612 emanating from the grating 606. Due to the blocking, the mirror 700 can serve to redirect light from the grating 606 toward the phase selector 610 and in so doing can form the light path 612. As such, the translation of the translatable mirror 602' into the shown configuration can form the light path 612 in the system 600. The translation to or from the positions shows in FIGS. 7A-B can occur in a direction that is substantially perpendicular to one or more of the planes of the light paths 612 and 614.

Figure 8A:
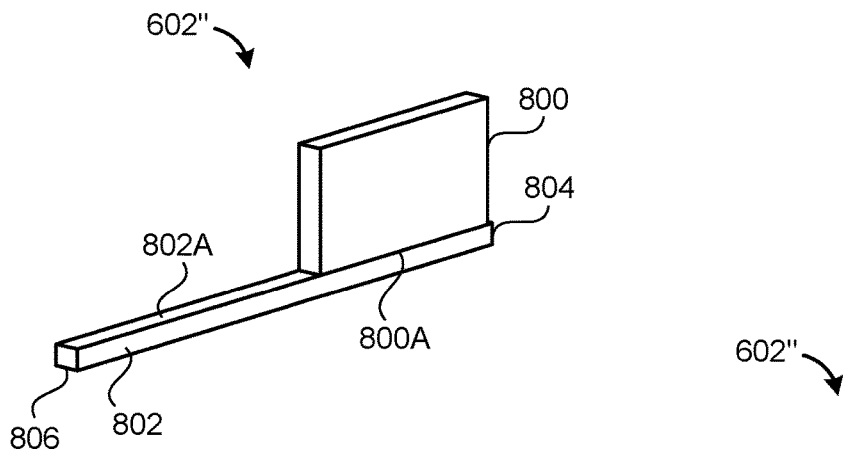
FIGS. 8A-B schematically show an example of horizontally translating mirrors that may be implemented as part of the system in FIG. 6.
Figure 8B:
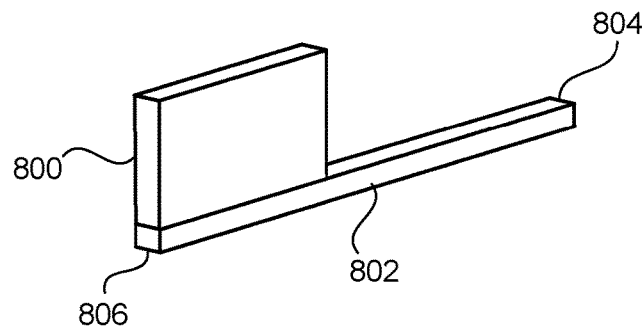

FIGS. 8A-B schematically show another example relating to the system 600 in FIG. 6. The described examples can be used in combination with one or more other examples described herein. A translatable mirror 602" is here schematically illustrated. The translatable mirror 602" can be used as, or as part of, the translatable mirror 602 in FIG. 6. The translatable mirror 602" includes a mirror 800 coupled to a track 802. Here, the mirror 800 has a rectangular shape and a side 800A of the mirror 800 faces a side 802A of the track 802. The track 802 can facilitate translation of the mirror 800 along the side 802A. For example, an actuator (not shown) can act on the mirror 800 and relocate it in either direction along the track 802.

FIG. 8A shows a configuration of the translatable mirror 602" with the mirror 800 positioned toward an end 804 of the track 802. In some implementations, the position in FIG. 8A can correspond to the formation of one or more light paths. For example, with reference again also to FIG. 6, the position of the mirror 800 toward the end 804 can facilitate interruption of the light path 612 between the light source 604 and the grating 606. Due to the blocking, the mirror 800 can serve to redirect light from the light source 604 toward the grating 608 and in so doing can form the light path 614. At an end 806 of the track 802 no mirror is currently positioned. As a result, the translatable mirror 602" may not interrupt the light path 614 between the grating 608 and the phase selector 610. As such, the translation of the translatable mirror 602" into the shown configuration can form the light path 614 in the system 600.

FIG. 8B shows a configuration of the translatable mirror 602" with the mirror 800 positioned toward the end 806 of the track 802. In some implementations, the position in FIG. 8B can correspond to the formation of one or more light paths. For example, with reference again also to FIG. 6, the absence of a mirror at the end 804 can facilitate propagation of the light from the light source 604 to the grating 606. Moreover, the position of the mirror 800 toward the end 806 can facilitate interruption of the light path 612 emanating from the grating 606. Due to the blocking, the mirror 800 can serve to redirect light from the grating 606 toward the phase selector 610 and in so doing can form the light path 612.

Figure 9:
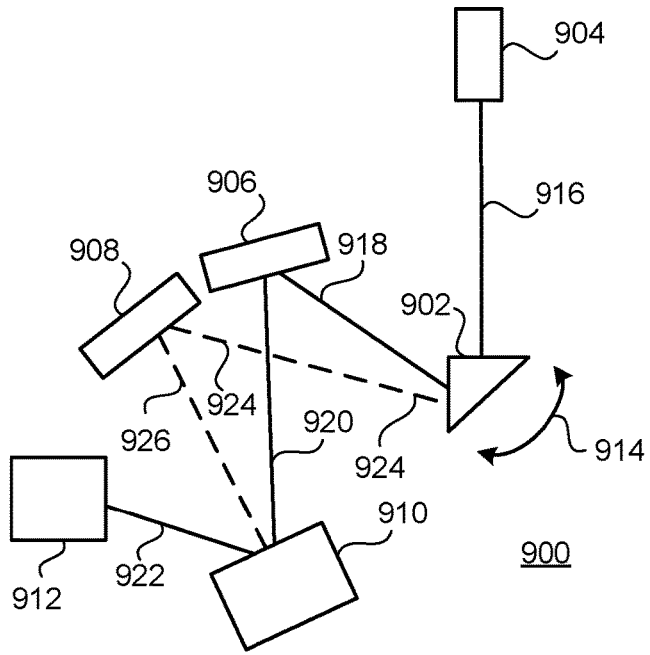
FIG. 9 is a schematic view of a system having a rotatable prism that may be implemented as part of the system of FIG. 1.

FIG. 9 schematically shows an example of a system 900 having a rotatable prism 902. The system 900 can be used in combination with one or more other examples described herein. The system 900 also includes a light source 904, a grating 906 and a grating 908, a phase selector 910, and a projection lens 912. An individual component of the system 900 can perform a similar or identical function to a corresponding component described with reference to another example in this description.

The rotatable prism 902 can undergo rotation about one or more rotational axes to assume one or more positions. Here, the rotatable prism 902 can be rotated about an axis perpendicular to the plane of the drawing, the rotation schematically indicated by an arrow 914. For simplicity, the rotatable prism 902 is here shown in a single orientation. However, the operation of the system 900 will be exemplified based on at least two different orientations of the rotatable prism 902. Here, the gratings 906 and 908 face toward the phase selector 910. Other placements or orientations can be used.

The light source 904 provides light 916 that propagates toward the rotatable prism 902. The light 916 will interact with the rotatable prism 902 and undergo reflection. Here, light 918 emanating from the rotatable prism 902 is the result of such reflection when the rotatable prism 902 is in a first position. The light 918 is directed toward the grating 906 and interacts therewith. Light 920 emanates from the grating 906 as a result of this interaction and propagates toward the phase selector 910 and interacts therewith. Light 922 emanates from the phase selector 910 as a result of this interaction and propagates toward the projection lens 912 and interacts therewith. That is, when the rotatable prism 902 is in the first position, it reflects the light 918 along a first light path from the rotatable prism 902 toward the grating 906.

Moreover, light 924 emanating from the rotatable prism 902 is the result of reflection of the light 916 when the rotatable prism 902 is in a second position. The light 924 is directed toward the grating 908 and interacts therewith. Light 926 emanates from the grating 908 as a result of this interaction and propagates toward the phase selector 910 and interacts therewith. The light 922 emanates from the phase selector 910 as a result of this interaction and propagates toward the projection lens 912 and interacts therewith. That is, when the rotatable prism 902 is in the second position, it reflects the light 924 along a second light path from the rotatable prism 902 toward the grating 908.

Figure 10:
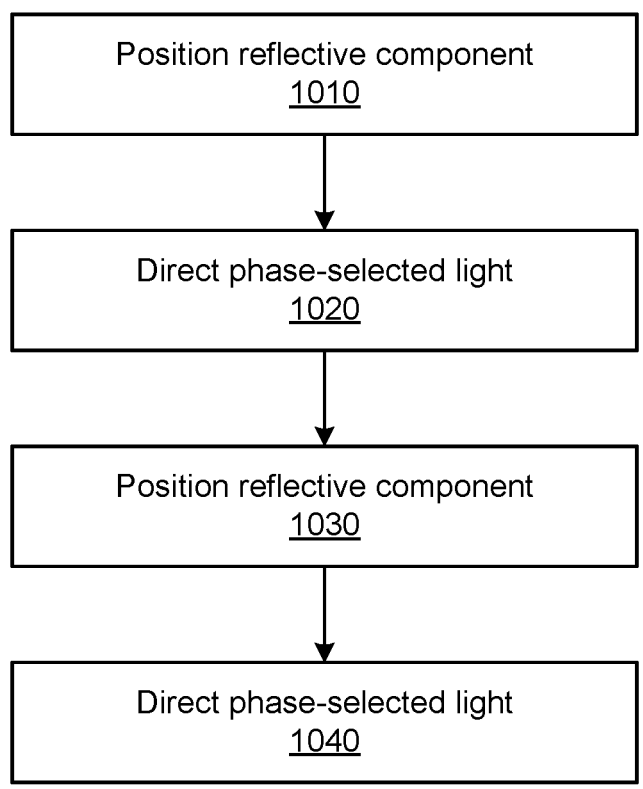
FIG. 10 shows an example of a method that can be used for positioning one or more reflective components for performing SIM.

FIG. 10 shows an example of a method 1000 that can be used for performing SIM. The method 1000 can be performed in one or more of the systems exemplified herein. The method 1000 can include more or fewer operations than shown. Two or more of the operations of the method 1000 can be performed in a different order unless otherwise indicated. Some aspects of other examples described herein will be referenced for illustrative purposes.

At 1010, the method 1000 includes positioning of a reflective component in a first position. The first position can facilitate definition of a first light path originating at a light source and extending to a first grating and thereafter to a subsequent component. For example, the rotatable mirror 202 can be placed in the position shown in FIGS. 3A-B to define the light path from the light source 204 to the grating 210 and thereafter to the piezo fringe shifter 212, the light path including the light 300, 304 and 308. As another example, the rotatable mirror 202 can be placed in the position shown in FIGS. 4A-B to define the light path from the light source 204 to the grating 208 and thereafter to the piezo fringe shifter 212, the light path including the light 300, 312 and 314. As another example, the mirrors 504 and 510 in FIG. 5 can be placed to define the light path that includes the light 522, 526 and 528. As another example, the mirrors 504 and 510 in FIG. 5 can be placed to define the light path that includes the light 522, 524 and 530. As another example, the translatable mirror 602' can be placed in the position shown in FIG. 7A to define the light path 614 in FIG. 6. As another example, the translatable mirror 602' can be placed in the position shown in FIG. 7B to define the light path 612 in FIG. 6. As another example, the translatable mirror 602" can be placed in the position shown in FIG. 8A to define the light path 614 in FIG. 6. As another example, the translatable mirror 602" can be placed in the position shown in FIG. 8B to define the light path 612 in FIG. 6. As another example, the rotatable prism 902 in FIG. 9 can be placed in the position that defines the light path that includes the light 916, 918, 920 and 922. As another example, the rotatable prism 902 in FIG. 9 can be placed in the position that defines the light path that includes the light 916, 924, 926 and 922. For example, the subsequent component can be the phase selector 108 in FIG. 1. As another example, the subsequent component can be the projection lens 110 in FIG. 11.

At 1020, the method 1000 includes directing first phase-selected light from the first light path onto a sample. For example, phase-selected light can be emanating from the piezo fringe shifter 212 (FIG. 2) and/or from one or more of the phase selectors 108 (FIG. 1), 512 (FIG. 5), 610 (FIG. 6) or 910 (FIG. 9). The phase-selected light can be directed onto the sample 116 in FIG. 1. Thus, the sample can be illuminated using the phase-selected light (e.g., structured light). The sample can be imaged (e.g., using the camera system 122 in FIG. 1) based on such illumination by the first phase-selected light and such operations are not explicitly discussed here for brevity.

At 1030, the method 1000 includes positioning of a reflective component in a second position. The second position can facilitate definition of a second light path originating at the light source and extending to a second grating and thereafter to the subsequent component. For example, the rotatable mirror 202 can be placed in the position shown in FIGS. 3A-B to define the light path from the light source 204 to the grating 210 and thereafter to the piezo fringe shifter 212, the light path including the light 300, 304 and 308. As another example, the rotatable mirror 202 can be placed in the position shown in FIGS. 4A-B to define the light path from the light source 204 to the grating 208 and thereafter to the piezo fringe shifter 212, the light path including the light 300, 312 and 314. As another example, the mirrors 504 and 510 in FIG. 5 can be placed to define the light path that includes the light 522, 526 and 528. As another example, the mirrors 504 and 510 in FIG. 5 can be placed to define the light path that includes the light 522, 524 and 530. As another example, the translatable mirror 602' can be placed in the position shown in FIG. 7A to define the light path 614 in FIG. 6. As another example, the translatable mirror 602' can be placed in the position shown in FIG. 7B to define the light path 612 in FIG. 6. As another example, the translatable mirror 602" can be placed in the position shown in FIG. 8A to define the light path 614 in FIG. 6. As another example, the translatable mirror 602" can be placed in the position shown in FIG. 8B to define the light path 612 in FIG. 6. As another example, the rotatable prism 902 in FIG. 9 can be placed in the position that defines the light path that includes the light 916, 918, 920 and 922. As another example, the rotatable prism 902 in FIG. 9 can be placed in the position that defines the light path that includes the light 916, 924, 926 and 922.

At 1040, the method 1000 includes directing second phase-selected light from the second light path onto the sample. For example, phase-selected light can be emanating from the piezo fringe shifter 212 (FIG. 2) and/or from one or more of the phase selectors 108 (FIG. 1), 512 (FIG. 5), 610 (FIG. 6) or 910 (FIG. 9). The phase-selected light can be directed onto the sample 116 in FIG. 1. Thus, the sample can be illuminated using the phase-selected light (e.g., structured light). The sample can be imaged (e.g., using the camera system 122 in FIG. 1) based on such illumination by the second phase-selected light and such operations are not explicitly discussed here for brevity.

Figure 11:
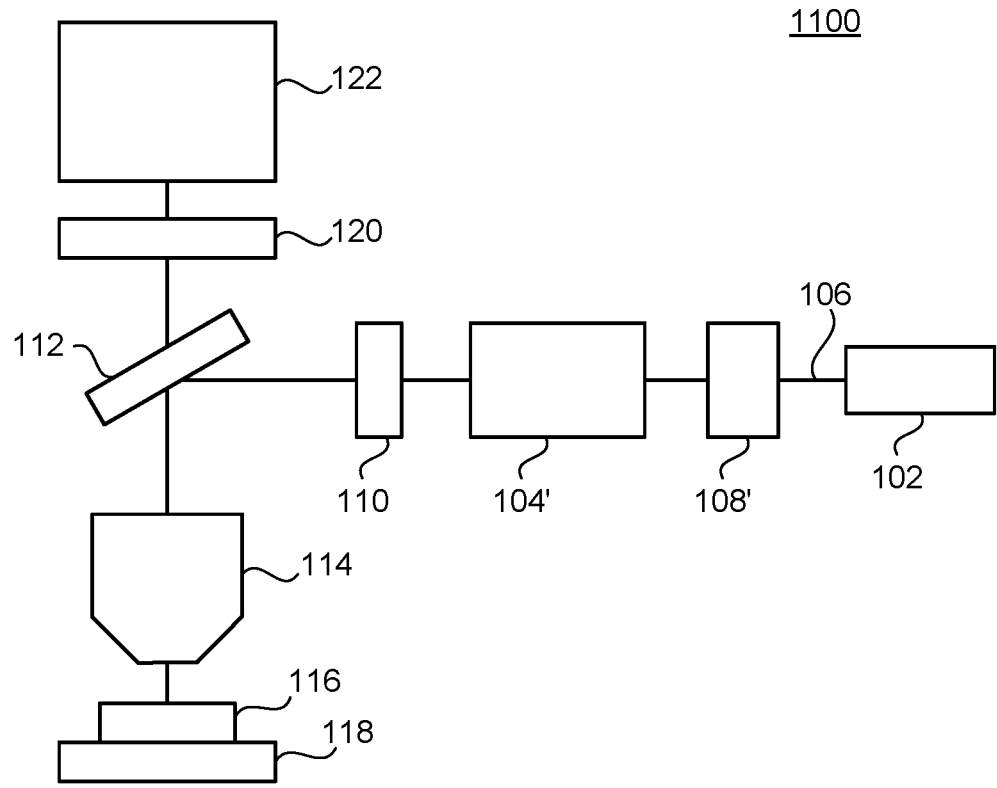
FIG. 11 is a schematic view of an example system that can facilitate SIM and in which a phase selector is placed before a reflective component.

FIG. 11 schematically shows another example of a system 1100 that can facilitate SIM. The system 1100 can be used in combination with one or more other examples described herein. Some components in this and other examples are shown conceptually as a block or other generic component; such component(s) can be implemented in form of one or more separate or integrated components so as to perform the indicated function(s). Components corresponding to those of the system 100 (FIG. 1) that are not explicitly mentioned can serve the same or a similar role in the system 1100.

The system 1100 includes a phase selector 108' positioned before a light-structuring component 104'. In some implementations, the phase selector 108' can receive the beam 106 from the light source 102. The phase selector 108' can provide phase-selected light to the light-structuring component 104'. The light-structuring component 104' can generate structured light and provide the structured light to a subsequent component in the system 1100. In some implementations, the subsequent component is the projection lens 110. Other approaches can be used.

In some implementations, the stage 118 can translate the sample 116 a distance relative to stationary light fringes to accomplish phase selection (e.g., using a piezo actuator in the stage 118). For example, the phase selector 108' can then be bypassed in, or eliminated from, the system 1100.

Figure 12:
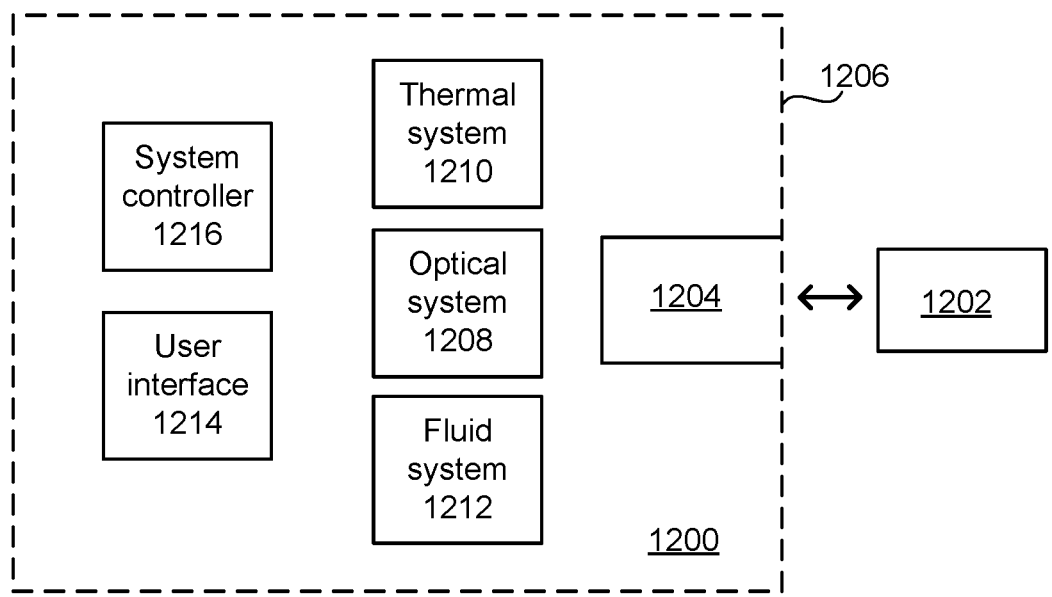
FIG. 12 is a schematic view of an example system that can be used for biological and/or chemical analysis; the system of FIG. 1 can be a part of the system in FIG. 12.

FIG. 12 is a schematic view of an example system 1200 that can be used for biological and/or chemical analysis. Systems and/or techniques described herein, including, but not limited to, the system 100 (FIG. 1) and/or the method 1000 (FIG. 10), can be part of the system 1200 in some implementations. The system 1200 can operate to obtain any information or data that relates to at least one biological and/or chemical substance. In some implementations, a carrier 1202 supplies material to be analyzed. For example, the carrier 1202 can include a cartridge or any other component holding the material. In some implementations, the system 1200 has a receptacle 1204 to receive the carrier 1202 at least during the analysis. The receptacle 1204 can form an opening in a housing 1206 of the system 1200. For example, some or all components of the system 1200 can be within the housing 1206.

The system 1200 can include an optical system 1208 for biological and/or chemical analysis of the material(s) of the carrier 1202. The optical system 1208 can perform one or more optical operations, including, but not limited to, illumination and/or imaging of the material(s). For example, the optical system 1208 can include any or all systems described elsewhere herein. As another example, the optical system 1208 can perform any or all operations described elsewhere herein.

The system 1200 can include a thermal system 1210 for providing thermal treatment relating to biological and/or chemical analysis. In some implementations, the thermal system 1210 thermally conditions at least part of the material(s) to be analyzed and/or the carrier 1202.

The system 1200 can include a fluid system 1212 for managing one or more fluids relating to biological and/or chemical analysis. In some implementations, the fluid(s) can be provided for the carrier 1202 or its material(s). For example, fluid can be added to and/or removed from the material of the carrier 1202.

The system 1200 includes a user interface 1214 that facilitates input and/or output relating to biological and/or chemical analysis. The user interface can be used to specify one or more parameters for the operation of the system 1200 and/or to output results of biological and/or chemical analysis, to name just a few examples. For example, the user interface 1214 can include one or more display screens (e.g., a touchscreen), a keyboard, and/or a pointing device (e.g., a mouse or a trackpad).

The system 1200 can include a system controller 1216 that can control one or more aspects of the system 1200 for performing biological and/or chemical analysis. The system controller 1216 can control the receptacle 1204, the optical system 1208, the thermal system 1210, the fluid system 1212, and/or the user interface 1214. The system controller 1216 can include at least one processor and at least one storage medium (e.g., a memory) with executable instructions for the processor.

Figure 13:
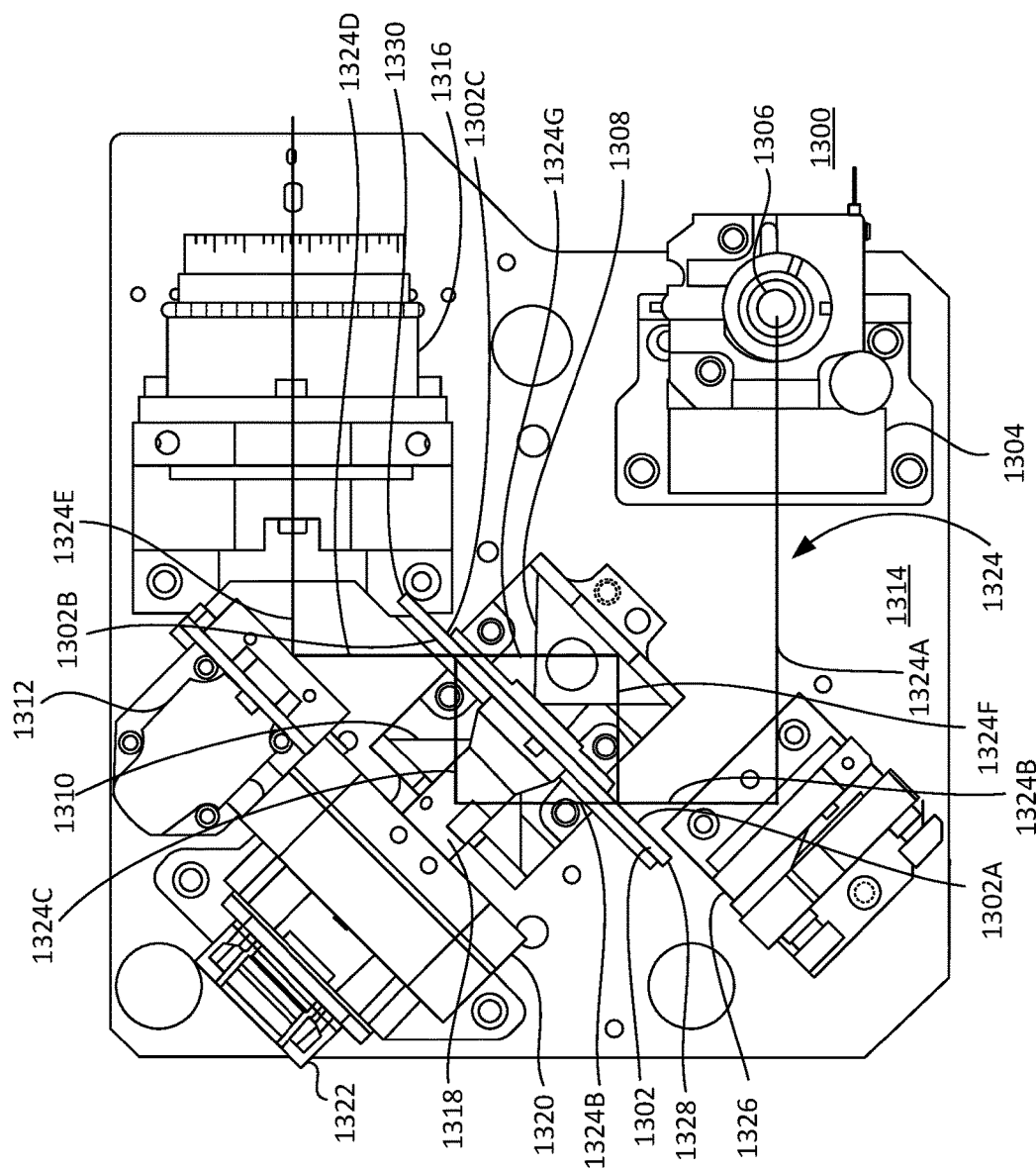
FIG. 13 shows an example of a system.

FIG. 13 shows an example of a system 1300 having a rotatable mirror 1302. In some implementations, the system 1300 can be characterized as a RIGS. The system 1300 can be used in combination with one or more other examples described herein. An individual component of the system 1300 can perform a similar or identical function to a corresponding component described with reference to another example in this description.

The system 1300 includes a light source 1304. In some implementations, the light source 1304 provides light that it in turn receives through at least one fiber optic cable 1306. For example, the light source 1304 and the fiber optic cable 1306 can collectively be considered a fiber launch module.

The system 1300 includes a grating 1308 and a grating 1310. In some implementations, the grating 1308 and/or 1310 can serve as a diffractive component with regard to light from the light source 1304. For example, the grating 1308 and/or 1310 can comprise a substrate with a periodic structure, the substrate combined with a prism. The gratings 1308 and 1310 can be positioned relative to each other according to one or more arrangements. Here, the gratings 1308 and 1310 face each other in the system 1300. The gratings 1308 and 1310 can be substantially identical to each other or can have one or more differences. The size, periodicity or other spatial aspect of one of the gratings 1308 and 1310 can differ from that/those of the other. The grating orientation (i.e., the spatial orientation of the periodic structure) of one of the gratings 1308 and 1310 can differ from that/those of the other. In some implementations, the respective grating orientations of the gratings 1308 and 1310, which gratings themselves face toward each other, can be substantially perpendicular to each other or at any other angle relative to each other. In some implementations, the gratings 1308 and 1310 can be at offset positions relative to the rotatable mirror 1302. In some implementations, the gratings 1308 and/or 1310 can be in a fixed position relative to the light source 1304.

The system 1300 can include one or more components (e.g., as a phase selector 108 of FIG. 1) to facilitate phase selection with regard to the light that should be applied to a sample (e.g., to the sample 116 in FIG. 1). Here, the system 1300 includes a piezo fringe shifter 1312. In some implementations, the piezo fringe shifter 1312 can receive light from the grating 1308 and/or 1310 and can perform phase selection with regard to some or all of that light. For example, the piezo fringe shifter 1312 can be used for controlling the pattern phase of the structured light using which a particular image should be captured. The piezo fringe shifter 1312 can include a piezo actuator. For example, a piezo piston system can be used to effectuate phase selection. Other approaches can be used. For example, a tilting optical plate can be used for phase selection. For example, the system 1300 is here implemented on a board 1314, and one or more areas of the board 1314 can be tilted to accomplish phase selection. As another example, one or more of the gratings 1308 and 1310 can be moved (e.g., translated) for the phase selection, such as by a piezo actuator. Light emanating from the piezo fringe shifter 1312 is sometimes referred to as phase-selected light, to indicate that the light has been conditioned according to a particular phase selection. In some implementations, the gratings 1308 and/or 1310 can be in a fixed position relative to the light source 1304.

The system includes a projection lens 1316 that can include one or more optical components (e.g., a lens) to condition light that is received from the piezo fringe shifter 1312. For example, the projection lens 1316 can control the characteristics of the light before the light enters an objective lens (e.g., the objective lens 114 in FIG. 1).

The rotatable mirror 1302 can be used to redirect at least one beam of light toward, and/or arriving from, one or more of the gratings 1308 or 1310. The rotatable mirror 1302 can include one or more materials so as to be sufficiently reflective of the electromagnetic waves with which the sample is to be illuminated. In some implementations, the light from the light source 1304 includes a laser beam of one or more wavelengths. For example, a metal-coated mirror and/or a dielectric mirror can be used. The rotatable mirror 1302 can be double-sided. For example, the rotatable mirror 1302 can be considered double-sided if it is capable of performing reflection on at least part of both its sides (e.g., reflective at a first end for a first beam path and reflective at a second end, opposite the first end, for a second beam path).

The rotatable mirror 1302 can include an elongate member. The rotatable mirror 1302 can have any of a variety of form factors or other shape characteristics. The rotatable mirror 1302 can have a generally flat configuration. The rotatable mirror 1302 can have a substantially square or otherwise rectangular shape. The rotatable mirror 1302 can have rounded corners. The rotatable mirror 1302 can have a substantially constant thickness. The reflective surfaces of the rotatable mirror 1302 can be substantially planar.

The rotatable mirror 1302 can be supported by an axle 1318 of the system 1300. The axle 1318 can allow the rotatable mirror 1302 to be rotated about the axle 1318 in either or both directions. The axle 1318 can be made of a material with sufficient rigidity to hold and manipulate the rotatable mirror 1302, such material(s) including, but not limited to, metal. The axle 1318 can be coupled substantially at a center of the rotatable mirror 1302. For example, the rotatable mirror 1302 can have an opening at the center, or a cutout from one side that reaches the center, so as to facilitate coupling with the axle 1318. As another example, the axle 1318 can include separate axle portions that are coupled to respective faces of the rotatable mirror 1302, without the need for any opening in the rotatable mirror 1302. The axle 1318 can have at least one suspension 1320. Here, the suspension 1320 is positioned at the ends of the axle 1318 on both sides of the rotatable mirror 1302. The suspension 1320 can include a bearing or other feature that facilitates low-friction operation.

The rotatable mirror 1302 can be actuated to assume one or more positions. Any form of motor or other actuator can be used for controlling the rotatable mirror 1302. In some implementations, a stepper motor 1322 is used. The stepper motor 1322 can be coupled to the axle 1318 and be used for causing the axle 1318, and thereby the rotatable mirror 1302, to rotate and assume the desired position(s). In some implementations, the rotatable mirror 1302 rotates in the same direction toward the new positions (e.g., always clockwise, or always counter-clockwise, about the rotation axis of the axle 1318). In some implementations, the rotatable mirror 1302 reciprocates between two or more positions (e.g., alternatingly clockwise or counter-clockwise, about the rotation axis of the axle 1318).

The light source 1304 here generates light 1324 which includes light 1324A that propagates between the light source 1304 and a mirror 1326. The light 1324 is schematically illustrated in the present figure to exemplify different possibilities of propagation. The mirror 1326 can be used to reflect the light 1324A into light 1324B directed toward the rotatable mirror 1302 and/or the grating 1310. The mirror 1326 can include one or more materials so as to be sufficiently reflective of the electromagnetic waves with which the sample is to be illuminated. In some implementations, the light from the light source 1304 includes a laser beam of one or more wavelengths. For example, a metal-coated mirror and/or a dielectric mirror can be used.

The rotatable mirror 1302 is positioned (e.g., oriented about the rotational axis of the axle 1318) so that a first end 1328 of the rotatable mirror 1302 does not interrupt the light 1324B. Currently, the first end 1328 may be positioned closer to the viewer than is the light 1324B which may propagate in the plane of the drawing. That is, a reflective surface 1302A of the rotatable mirror 1302 that faces toward the light source 1304 currently does not interrupt the light 1324B because the first end 1328 does not block the path of the light 1324B. The light 1324B therefore propagates (through air, vacuum, or another fluid) until reaching the grating 1310.

The light 1324B interacts with the grating 1310 in one or more ways. In some implementations, the light 1324B undergoes diffraction based on the grating 1310. Here, light 1324C is structured light (e.g., having one or more pattern fringes) that emanates from the grating 1310 based on the interaction therewith by the light 1324B. The light 1324C initially propagates substantially in a direction generally toward the side of the projection lens 1316. However, the position of the rotatable mirror 1302 is such that a second end 1330 of the rotatable mirror 1302 does interrupt the light 1324C. The second end 1330 can be opposite the first end 1328. In some implementations, the first end 1328 and the second end 1330 can be positioned at any angle relative to each other, such as any angle between 0 degrees and 180 degrees. Currently, the second end 1330 may be positioned about as close to the viewer as is the light 1324C. That is, a reflective surface 1302B of the rotatable mirror 1302 that faces toward the grating 1310 does interrupt the light 1324C because the second end 1330 blocks the path of the light 1324C. From the light 1324C, the rotatable mirror 1302 therefore directs light 1324D toward the piezo fringe shifter 1312.

The piezo fringe shifter 1312 performs phase selection on the light 1324D. For example, the piezo fringe shifter 1312 selects the pattern phase to which the sample is to be subjected in the present illumination (e.g., for purposes of capturing one or more particular images). Light 1324E emanates from the piezo fringe shifter 1312 and propagates toward, and enters, the projection lens 1316. The light 1324E corresponds to a specific phase selection made using the piezo fringe shifter 1312. The light 1324E can therefore be characterized as phase-selected light. The light 1324E can then continue to propagate through the system (e.g., as in the system 100 in FIG. 1), for example to illuminate the sample 116.

Here, the characteristics of the phase-selected electromagnetic waves of the light 1324E correspond to the fact that the light 1324B is diffracted by the grating 1310 and that phase-selection is performed by the piezo fringe shifter 1312. The involvement of the grating 1310, moreover, was here a result of the positioning of the rotatable mirror 1302 so that the second end 1330 thereof interrupted the light 1324C, whereas the first end 1328 did not interrupt the light 1324B.

Assume now that the rotatable mirror 1302 instead is placed in a different position. Similar to the previous example, the light source 1304 here generates the light 1324A that initially propagates toward the mirror 1326. However, unlike the previous example, the rotatable mirror 1302 is here positioned (e.g., oriented about the rotational axis of the axle 1318) so that the first end 1328 of the rotatable mirror 1302 does interrupt the light 1324B. Currently, the first end 1328 may be positioned about as close to the viewer as is the light 1324B. That is, the reflective surface 1302A of the rotatable mirror 1302 that faces toward the light source 1304 does interrupt the light 1324B because the first end 1328 blocks the path of the light 1324B. Light 1324F therefore propagates (through air, vacuum, or another fluid) until reaching the grating 1308.

The light 1324F interacts with the grating 1308 in one or more ways. In some implementations, the light 1324F undergoes diffraction based on the grating 1308. Here, light 1324G is structured light (e.g., having one or more pattern fringes) that emanates from the grating 1308 based on the interaction therewith by the light 1324F. The light 1324G propagates substantially in a direction toward the piezo fringe shifter 1312. The position of the rotatable mirror 1302 is such that the second end 1330 of the rotatable mirror 1302 does not interrupt the light 1324G. Currently, the second end 1330 may be positioned closer to the viewer than is the light 1324G. That is, neither the reflective surface 1302B of the rotatable mirror 1302, nor a reflective surface 1302C that faces toward the grating 1308, currently interrupts the light 1324G because the second end 1330 does not block the path of the light 1324G. The light 1324G therefore propagates until reaching the piezo fringe shifter 1312.

The piezo fringe shifter 1312 performs phase selection on the light 1324G. For example, the piezo fringe shifter 1312 selects the pattern phase to which the sample is to be subjected in the present illumination (e.g., for purposes of capturing one or more particular images). Light 1324E emanates from the piezo fringe shifter 1312 and propagates toward, and enters, the projection lens 1316, similar to the examples described above.

Here, the characteristics of the phase-selected electromagnetic waves of the light 1324E correspond to the fact that the light 1324F is diffracted by the grating 1308 and that phase-selection is performed by the piezo fringe shifter 1312. The involvement of the grating 1308, moreover, was here a result of the positioning of the rotatable mirror 1302 so that the first end 1328 thereof interrupted the light 1324B, whereas the second end 1330 did not interrupt the light 1324G. The rotatable mirror 1302 can be caused to repeatedly assume different positions (e.g., the ones described in the present examples, respectively) by various rotations. For example, the rotatable mirror 1302 can reciprocate between these positions. As another example, the rotatable mirror 1302 can rotate in the same direction (e.g., clockwise or counter-clockwise, from the perspective of the stepper motor 1322) to repeatedly assume the positions.

As mentioned above, the gratings 1308 and 1310 can have different grating orientations with respect to each other. For example, the gratings 1308 and 1310 can have grating orientations that are substantially perpendicular to each other. The light 1324C emanating from the grating 1310, and the light 1324G, emanating from the grating 1308, can therefore have different characteristics. For example, the pattern of fringes can be different in one of the lights 1324C and 1324G than in the other. Illuminating the sample (e.g., the sample 116 in FIG. 1) with differently structured light can facilitate use of the system 1300 for SIM imaging.

The above examples illustrate a system that includes a light source (e.g., the light source 1304); a first grating (e.g., the grating 1310) and a second grating (e.g., the grating 1308); a phase selector (e.g., the piezo fringe shifter 1312); and at least one reflective component (e.g., the rotatable mirror 1302). In a first position (e.g., as firstly exemplified) the reflective component forms a first light path from the light source to the first grating (e.g., by the first end 1328 not interrupting the light 1324B) and thereafter to the phase selector (e.g., by the second end 1330 blocking the light 1324C). In a second position (e.g., as secondly exemplified), the reflective component forms a second light path from the light source to the second grating (e.g., by the first end 1328 blocking the light 1324B) and thereafter to the phase selector (e.g., by the second end 1330 not interrupting the light 1324G).

The above examples also illustrate a system that includes a light source (e.g., the light source 1304); a first grating (e.g., the grating 1308) and a second grating (e.g., the grating 1310); a phase selector (e.g., the piezo fringe shifter 1312); and at least one mirror (e.g., the rotatable mirror 1302). Particularly, the mirror has a first position (e.g., as secondly exemplified) that interrupts (e.g., by the first end 1328) a first path from the light source to the second grating, while not interrupting (e.g., by the second end 1330 not blocking the light 1324G) a second path from the first grating to the phase selector. The mirror has a second position (e.g., as firstly exemplified) that interrupts (e.g., by the second end 1330) a third path from the second grating and directs second light (e.g., the light 1324D) toward the phase selector, while not interrupting the first path (e.g., by the first end 1328 not blocking the light 1324B).

Examples herein relate to using a reflective component and one or more gratings to provide structured light which can be used for SIM imaging. In some implementations, the mechanical motion can be significant (e.g., by rotating a mirror or another reflective component). However, reasonable mechanical and motion tolerances can be provided. For example, less or no precision may be needed regarding the start or stop positions of a reflective component (e.g., a mirror or a prism mirror); and stability and repeatability can be provided (e.g., with a rotatable mirror) by using precision bearings (e.g., in the suspension 1320), a precision spindle (e.g., in the axle 318), and/or an accurate mirror (e.g., with the rotatable mirror 1302 having low runout and/or good flatness). The stability and repeatability may be made independent of parts that can wear out (e.g., guide ways and/or end stops).

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system comprising:
a light source;
a first grating;
a second grating;
a rotatable reflective component that is rotatable between a first position and a second position; and
a phase selector;
wherein, when the rotatable reflective component is in the first position, the rotatable reflective component forms a first light path comprising the light source, the first grating, and the phase selector, and wherein, when the rotatable reflective component is in the second position, the rotatable reflective component forms a second light path comprising the light source, the second grating, and the phase selector.

2. The system of claim 1, wherein the first grating comprises a first substrate having a first periodic structure, and wherein the second grating comprises a second substrate having a second periodic structure.

3. The system of claim 2, wherein the first periodic structure has a first grating orientation and the second periodic structure has a second grating orientation, wherein the first grating orientation is substantially perpendicular to the second grating orientation.

4. The system of claim 1, wherein the first grating comprises a first prism, and wherein the second grating comprises a second prism.

5. The system of claim 1, wherein the first grating is positioned substantially perpendicular to the second grating.

6. The system of claim 1, wherein the rotatable reflective component comprises a rotatable mirror.

7. The system of claim 6, wherein the rotatable mirror is double sided.

8. The system of claim 6, wherein the rotatable mirror reciprocates between the first position and the second position.

9. The system of claim 1, wherein the rotatable reflective component comprises a rotatable prism.

10. The system of claim 1, wherein the light source comprises a fiber optic cable.

11. The system of claim 1, wherein light from the light source comprises a laser beam of one or more wavelengths.

12. The system of claim 1 further comprising a projection lens.

13. The system of claim 1, wherein the phase selector comprises a piezo actuator.

14. A system comprising:
a light source;
a first grating;
a second grating;
a translatable reflective component that is translatable between a first position and a second position; and
a phase selector;
wherein, when the translatable reflective component is in the first position, the translatable reflective component forms a first light path comprising the light source, the first grating, and the phase selector, and wherein, when the translatable reflective component is in the second position, the translatable reflective component forms a second light path comprising the light source, the second grating, and the phase selector.

15. The system of claim 14, wherein the first grating comprises a first substrate having a first periodic structure, and wherein the second grating comprises a second substrate having a second periodic structure.

16. The system of claim 15, wherein the first periodic structure has a first grating orientation and the second periodic structure has a second grating orientation, wherein the first grating orientation is substantially perpendicular to the second grating orientation.

17. The system of claim 14, wherein the translatable reflective component comprises a translatable mirror.

18. The system of claim 17, wherein the translatable mirror is horizontally translatable relative to the first grating.

19. The system of claim 17, wherein the translatable mirror is vertically translatable relative to the first grating.

20. A system comprising:
a light source;
a first grating comprising a first periodic structure and a first prism;
a second grating comprising a second periodic structure and a second prism;
a rotatable mirror that is reciprocally rotatable between a first position and a second position; and
a phase selector;
wherein, when the rotatable mirror is in the first position, the rotatable mirror forms a first light path comprising the light source, the first grating, and the phase selector, and wherein, when the rotatable mirror is in the second position, the rotatable mirror forms a second light path comprising the light source, the second grating, and the phase selector.

* * * * *